(12) United States Patent
Yu et al.

(10) Patent No.: US 12,477,327 B2
(45) Date of Patent: Nov. 18, 2025

(54) PARAMETERS FOR APPLICATION COMMUNICATION ESTABLISHMENT

(71) Applicant: ZTE Corporation, Guangdong (CN)

(72) Inventors: Wantao Yu, Guangdong (CN); Shilin You, Guangdong (CN); Yuze Liu, Guangdong (CN); Jin Peng, Guangdong (CN); Zhaoji Lin, Guangdong (CN); Yuxin Mao, Guangdong (CN)

(73) Assignee: ZTE Corporation, Shenzhen (CN)

( * ) Notice: Subject to any disclaimer, the term of this patent is extended or adjusted under 35 U.S.C. 154(b) by 249 days.

(21) Appl. No.: 17/852,359

(22) Filed: Jun. 28, 2022

(65) Prior Publication Data
US 2022/0330019 A1  Oct. 13, 2022

Related U.S. Application Data

(63) Continuation of application No. PCT/CN2020/082337, filed on Mar. 31, 2020.

(51) Int. Cl.
*H04W 12/041* (2021.01)
*H04L 9/40* (2022.01)

(52) U.S. Cl.
CPC ....... *H04W 12/041* (2021.01); *H04L 63/0876* (2013.01)

(58) Field of Classification Search
CPC . H04W 12/041; H04W 12/069; H04W 12/75; H04W 12/72; H04W 12/71; H04L 63/0876; H04L 63/0815; H04L 2209/80; H04L 9/0838; H04L 9/0866
See application file for complete search history.

(56) References Cited

U.S. PATENT DOCUMENTS

| | | | | |
|---|---|---|---|---|
| 10,271,205 B1* | 4/2019 | Ahluwalia | ............ | H04W 76/11 |
| 10,863,412 B2* | 12/2020 | Baek | ............... | H04W 76/11 |
| 11,956,627 B2* | 4/2024 | Nair | ............... | H04W 12/61 |
| 2002/0180582 A1* | 12/2002 | Nielsen | ............... | G07C 9/21 |
| | | | | 340/5.6 |
| 2003/0205070 A1* | 11/2003 | Chaum | ............... | G05B 19/00 |
| | | | | 70/278.3 |

(Continued)

FOREIGN PATENT DOCUMENTS

| | | | | |
|---|---|---|---|---|
| CA | 3159134 A1 * | 5/2021 | ......... | H04L 63/0428 |
| CN | 112399412 A * | 2/2021 | ............ | H04L 63/20 |

(Continued)

OTHER PUBLICATIONS

John Scourias, "Overview of the Global System for Mobile Communications", University of Waterloo, May 19, 1995, 58 pages (Year : 1995).*

(Continued)

*Primary Examiner* — Shahriar Zarrineh
(74) *Attorney, Agent, or Firm* — Perkins Coie LLP

(57) ABSTRACT

Methods, apparatus, and systems to establish a secure communication in a wireless network are described. In one example aspect, a wireless communication method includes generating, by a first function entity, a first identifier configured to be used to establish a secure communication for a first device, using at least a mobile country code, a mobile network code, and a random number, and transmitting the first identifier to the first device.

18 Claims, 22 Drawing Sheets

(56) References Cited

U.S. PATENT DOCUMENTS

| | | | |
|---|---|---|---|
| 2006/0167921 A1* | 7/2006 | Grebus | G06F 11/3055 |
| | | | 707/999.102 |
| 2008/0186903 A1* | 8/2008 | Hedberg | H04W 8/26 |
| | | | 370/319 |
| 2009/0066476 A1* | 3/2009 | Raheman | G07C 9/00904 |
| | | | 455/556.1 |
| 2011/0004762 A1* | 1/2011 | Horn | H04W 12/04 |
| | | | 713/171 |
| 2011/0128121 A1* | 6/2011 | Shachar | G07C 9/00309 |
| | | | 340/5.24 |
| 2012/0180123 A1* | 7/2012 | Kuenzi | H04L 67/10 |
| | | | 726/20 |
| 2013/0331063 A1* | 12/2013 | Cormier | H04L 63/0853 |
| | | | 455/411 |
| 2015/0099485 A1* | 4/2015 | Chuang | H04M 1/72463 |
| | | | 455/411 |
| 2016/0205527 A1* | 7/2016 | Hui | H04W 4/021 |
| | | | 455/404.2 |
| 2016/0345151 A1* | 11/2016 | Chen | H04W 4/24 |
| 2017/0094498 A1* | 3/2017 | El-Gawady | H04W 8/26 |
| 2018/0288582 A1* | 10/2018 | Buckley | H04W 12/06 |
| 2019/0141510 A1* | 5/2019 | Buckley | H04W 12/0431 |
| 2019/0253894 A1* | 8/2019 | Bykampadi | H04L 67/51 |
| 2020/0068391 A1 | 2/2020 | Liu et al. | |
| 2020/0100085 A1* | 3/2020 | Buckley | H04W 4/90 |
| 2020/0228982 A1* | 7/2020 | He | H04W 12/06 |
| 2020/0267625 A1* | 8/2020 | Deshmukh | H04W 8/04 |
| 2021/0058776 A1* | 2/2021 | Nair | H04W 12/06 |
| 2022/0295276 A1* | 9/2022 | Yang | H04L 9/3247 |

FOREIGN PATENT DOCUMENTS

| | | | | |
|---|---|---|---|---|
| CN | 113225176 A * | 8/2021 | | H04L 63/061 |
| CN | 114766083 A * | 7/2022 | | H04L 9/083 |
| CN | 113541925 B * | 2/2023 | | H04L 9/0819 |
| CN | 113543127 B * | 2/2023 | | |
| EP | 3358867 A1 | 8/2018 | | |
| EP | 3890404 A1 * | 10/2021 | | H04W 28/16 |
| KR | 20220100669 A * | 7/2022 | | |
| KR | 20220114638 A * | 8/2022 | | H04W 12/041 |
| WO | WO-2015135269 A1 * | 9/2015 | | H04W 12/06 |
| WO | WO-2019096279 A1 * | 5/2019 | | H04L 9/32 |
| WO | 2019/193105 A1 | 10/2019 | | |
| WO | WO-2020063317 A1 * | 4/2020 | | H04L 12/4633 |
| WO | WO-2020149240 A1 * | 7/2020 | | H04W 60/00 |
| WO | WO-2020152087 A1 * | 7/2020 | | H04L 9/083 |
| WO | WO-2020152140 A1 * | 7/2020 | | H04W 12/009 |
| WO | WO-2021031053 A1 * | 2/2021 | | H04L 63/06 |
| WO | WO-2021196011 A1 * | 10/2021 | | H04W 76/11 |

OTHER PUBLICATIONS

Caimu Tang, "An Efficient Mobile Authentication Scheme for Wireless Networks", Published in: IEEE Transactions on Wireless Communications ( vol. 7, Issue: 4, Apr. 2008), 9 pages (Year: 2008).*

International Search Report and Written Opinion for International Patent Application No. PCT/CN2020/082337, mailed Dec. 28, 2020 (8 pages).

Huawei et al., "AKMA: Key ID generation," 3GPP TSG-SA3 Meeting #98e, S3-200216, e-meeting, Mar. 2020.

Ericsson, "pCR to TS 33.535: Update of the AKMA procedures," 3GPP TSG-SA3 Meeting #98e, S3-200296, e-meeting, Mar. 2020.

Huawei et al., "The time when the key identifier is generated," 3GPP TSG-SA3 Meeting #98e, S3-200255, e-meeting, Mar. 2020.

Huawei et al., "AKMA: Key ID generation," 3GPP TSG-SA3 Meeting #98e, S3-200499, revision of S3-200216, e-meeting, Mar. 2020.

Ericsson, "AUSF selection for AKMA," 3GPP TSG-SA3 Meeting #98e, S3-200294, e-meeting, Mar. 2020.

ZTE, "Resolve EN about derivation of KAF key identifier," 3GPP TSG-SA3 Meeting #98e, S3-200132, e-meeting, Mar. 2020.

Office Action for Japanese Patent Application No. 2022-538926, mailed Apr. 7, 2023, with English summary (10 pages).

3rd Generation Partnership Project, "Technical Specification Group Services and System Aspects: Study on authentication and key management for applications based on 3GPP credential in 5G," 3GPP TR 33.835 V2.0.0, Release 16, Dec. 2019.

Samsung, "AKMA and Application Key Derivation," 3GPP TSG-SA3 Meeting #98e, e-meeting, S3-200171, 5 pages, Mar. 2-6, 2020.

Extended European Search Report for European Patent Application No. 20890101.7, mailed Nov. 7, 2022 (10 pages).

First Office Action dated Nov. 15, 2024 for Chinese Patent Application No. 202080098403.8 with English Translation, 27 pages.

Notice of Allowance dated Sep. 19, 2024 for Korean Patent Application No. 10-2022-7022518, 8 pages.

CNIPA, Second Office Action for Chinese Application No. 202080098403.8, mailed on Apr. 10, 2025, 10 pages with unofficial English translation.

CNIPA, Notification to Complete Formalities of Registration for Chinese Application No. 202080098403.8, mailed on Aug. 6, 2025, 9 pages with unofficial English translation.

* cited by examiner

PARAMETERS FOR APPLICATION COMMUNICATION ESTABLISHMENT

CROSS REFERENCE TO RELATED APPLICATIONS

This patent document is a continuation of and claims benefit of priority to International Patent Application No. PCT/CN2020/082337, filed on Mar. 31, 2020. The entire content of the before-mentioned patent application is incorporated by reference as part of the disclosure of this application.

TECHNICAL FIELD

This document generally relates to wireless communications.

BACKGROUND

Efforts are currently underway to define next generation wireless communication networks that provide greater deployment flexibility, support for a multitude of devices and services and different technologies for efficient bandwidth utilization. The next generation wireless communication networks are also expected to deploy new core networks that provide additional services and flexibility beyond currently available core networks.

SUMMARY

This document provides techniques for improving the security process for protecting the application session between a user equipment and an application function entity in a wireless network.

In an example embodiment of the disclosed technology, a wireless communication method includes generating, by a first function entity, a first identifier configured to be used to establish a secure communication for a first device, using at least a mobile country code, a mobile network code, and a random number, and transmitting the first identifier to the first device.

In another example embodiment of the disclosed technology, a wireless communication method includes generating, by a first function entity or a first device, a first identifier configured to be used to establish a secure communication for the first device, using a mobile country code, a mobile network code, a random number, and an indicator, and transmitting the first identifier to the first device.

In yet another example embodiment of the disclosed technology, a wireless communication method includes generating, by a first device, a first identifier configured to be used to establish a secure communication for the first device, using a mobile country code, a mobile network code, a random number, and a routing indicator, and storing, by the first device, the first identifier for a subsequent request to an application function entity.

In yet another example embodiment of the disclosed technology, a wireless communication method includes obtaining, upon completion of a primary authentication, an intermediate key stored at a first function entity and a first device, generating an anchor key for an authentication and key management for applications based on the intermediate key, generating a first identifier using a mobile country code, a mobile network code, a routing indicator, an anchor function entity identifier for authentication and key management for applications, a random number, and a first device identifier, storing the first identifier and the anchor key for authentication and key management for applications, and using the first identifier to establish a secure communication for the first device.

In yet another example embodiment of the disclosed technology, the above-described methods are embodied in the form of processor-executable code and stored in a computer-readable program medium.

In yet another example embodiment of the disclosed technology, a device that is configured or operable to perform the above-described methods is disclosed.

The above and other aspects and their implementations are described in greater detail in the drawings, the descriptions, and the claims.

DETAILED DESCRIPTION

Figure 1A:
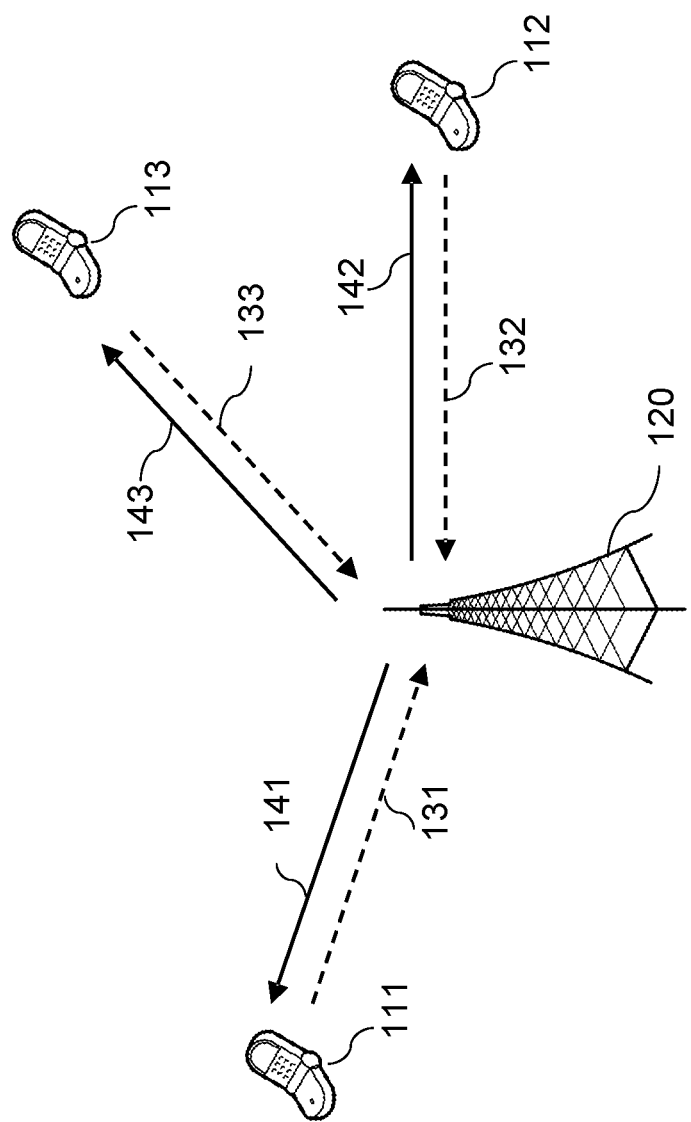
FIG. 1A shows an example of a wireless communication system.

FIG. 1A shows an example of a wireless communication system (e.g., an LTE, 5G New Radio (NR) cellular network) that includes a radio access node 120 and one or more user equipment (UE) 111, 112 and 113. In some embodiments, the downlink transmissions (141, 142, 143) include a control plane message that comprises a processing order for processing the plurality of user plane functions. This may be followed by uplink transmissions (131, 132, 133) based on the processing order received by the UEs. Similarly, the user plane functions can be processed by UEs for downlink transmissions based on the processing order received. The UE may be, for example, a smartphone, a tablet, a mobile computer, a machine to machine (M2M) device, a terminal, a mobile device, an Internet of Things (IoT) device, and so on.

This patent document uses examples from the 3GPP New Radio (NR) network architecture and 5G protocol only to facilitate understanding and the disclosed techniques and embodiments may be practiced in other wireless systems that use different communication protocols than the 3GPP protocols.

Figure 1B:
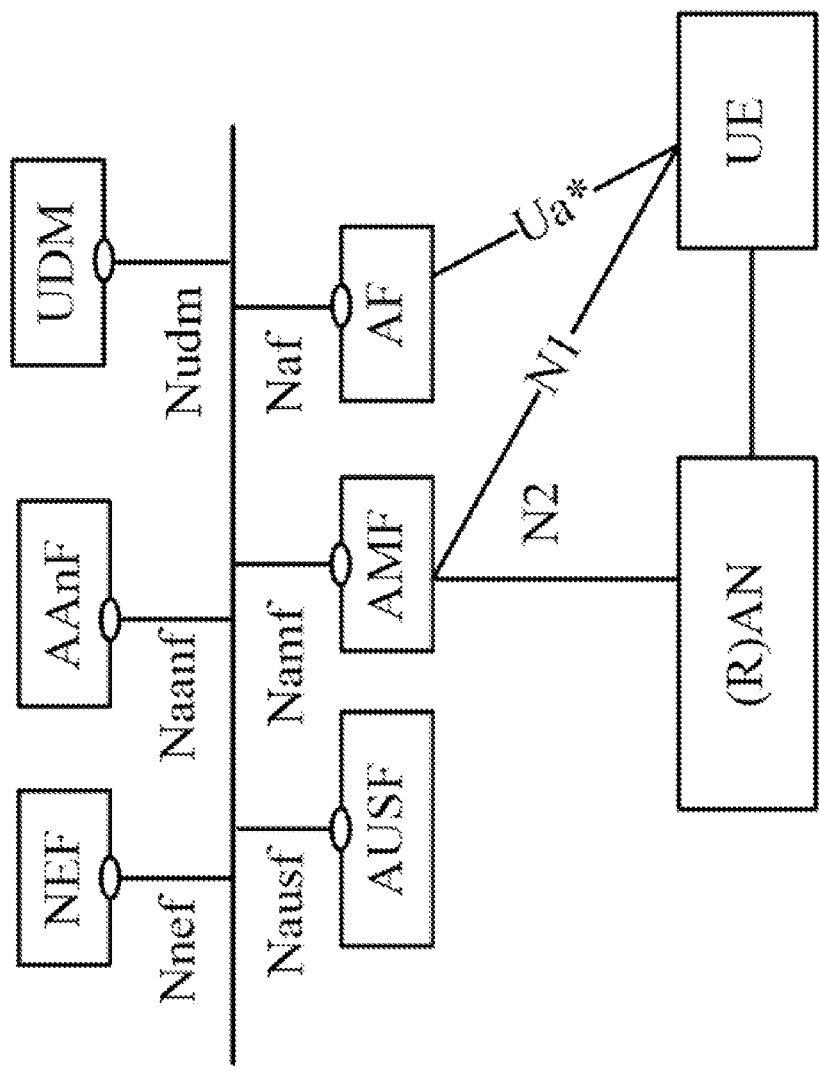
FIG. 1B shows an example architecture of a fundamental network model for authentication and key management for applications (AKMA).

FIG. 1B shows an example architecture of a fundamental network model for authentication and key management for applications (AKMA), including a network exposure function (NEF), an AKMA anchor function (AAnF), a unified data management (UDE), an authentication server function (AUSF), an access and mobility management function (AMF) and an application function (AF). In some implementations, the network model may include network functions within the 5G core architecture control plane, and such network functions may use service-based interfaces for their interactions.

The AKMA framework can be used to support secure communications and data exchange between the UE and an application server. In an example AKMA architecture, the AKMA authentication can be conducted using a result of the primary/access authentication to protect the communication between the UE and the application server. In this example architecture, when the UE communicates with an application server, secure communications between the UE and the application server can be established, without requiring a new AKMA authentication, by means of an application key KAF. In an application session establishment process based on the example AKMA architecture, the UE uses a key identifier to request an AKMA application function to establish the application key KAF. The application key KAF is derived from an intermediate key such as KAUSF, or derived from an AKMA anchor key KAKMA, where the KAKMA is derived from the KAUSF.

In the session establishing process, the key identifier included in the request information is sent to the AKMA anchor function (AAnF) form the user equipment (UE). The AKMA anchor function (AAnF) sends the request, including the AKMA key identifier sent by the UE, to the authentication server function (AUSF) to obtain the KAKMA for a specific user equipment (UE). Because the key identifier does not include any information relating to a specific authentication server function (AUSF) instance, however, the AKMA anchor function (AAnF) cannot correctly select a proper authentication server function (AUSF) instance based on the key identifier. Therefore, the key identifier is not sufficient to establish secure communications between the user equipment (UE) and the AKMA application function.

Figure 2:
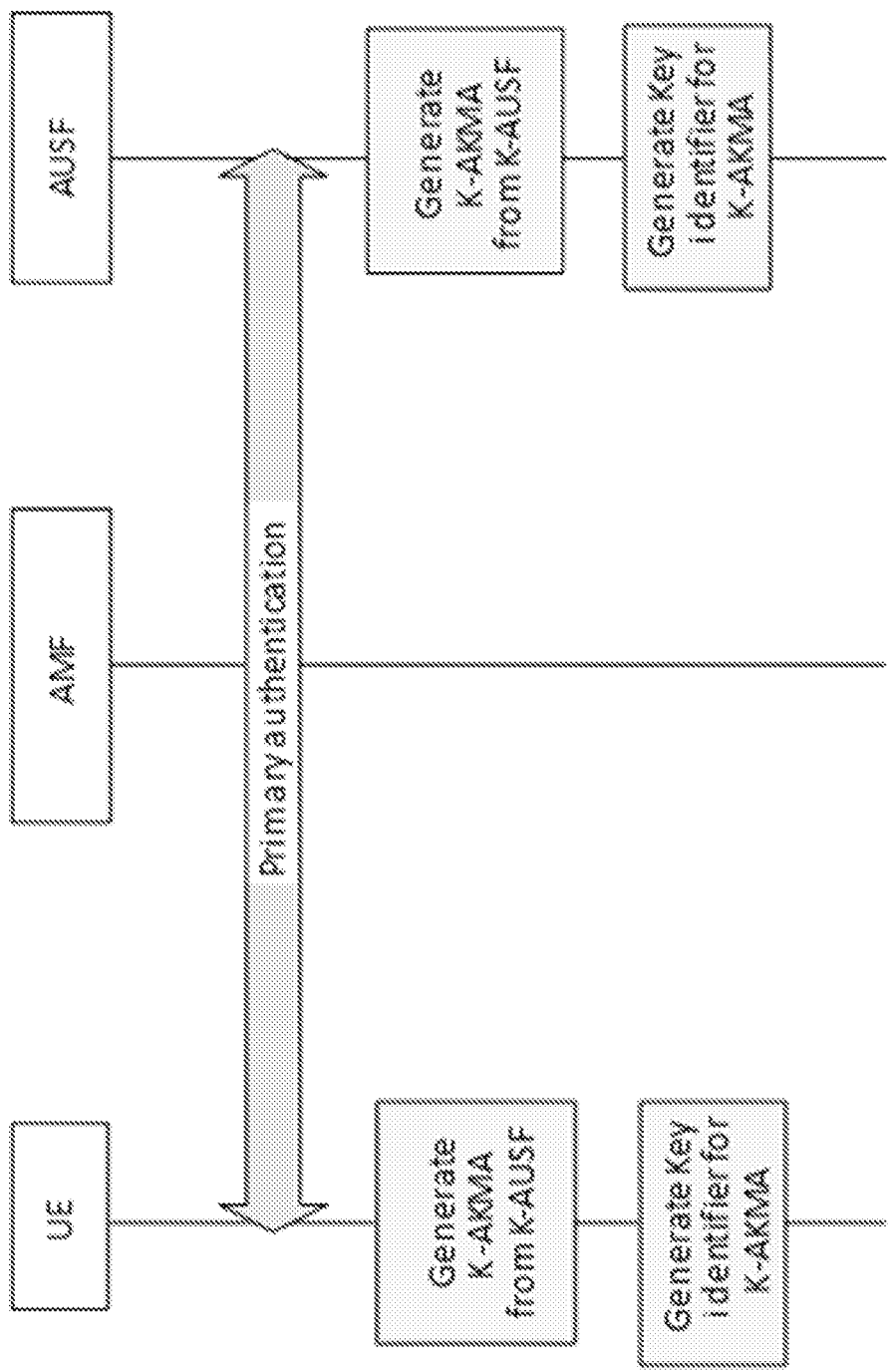
FIG. 2 shows deriving AKMA root key during a user equipment (UE) registration.

FIG. 2 shows deriving AKMA root key during a user equipment (UE) registration.

An authentication and key management for applications (AKMA) require a new logical entity such as the AKMA anchor function (AAnF). The AAnF is an anchor function in the home public land mobile network (HPLMN) that generates the key material to be used between the UE and the AF and maintains user equipment (UE) authentication/key management for applications (AKMA) contexts to be used for subsequent bootstrapping requests. There is no separate authentication of the UE to support AKMA functionality. Instead, it reuses the 5G primary authentication procedure executed during the UE registration to authenticate the UE. A successful 5G primary authentication results in the intermediate key KAUSF being stored at the AUSF and the UE.

As shown in FIG. 2, the UE and the authentication server function (AUSF) may generate the AKMA anchor key (KAKMA) and the associated key identifier from the intermediate key (e.g., KAUSF) as part of the UE registration procedure. The KAKMA key identifier is used to identify the KAKMA key of the UE from which other AKMA keys are derived. Since AKMA keys are based on the intermediate key such as KAUSF from a primary authentication run, the AKMA keys can only be refreshed by running a fresh primary authentication.

Figure 3:
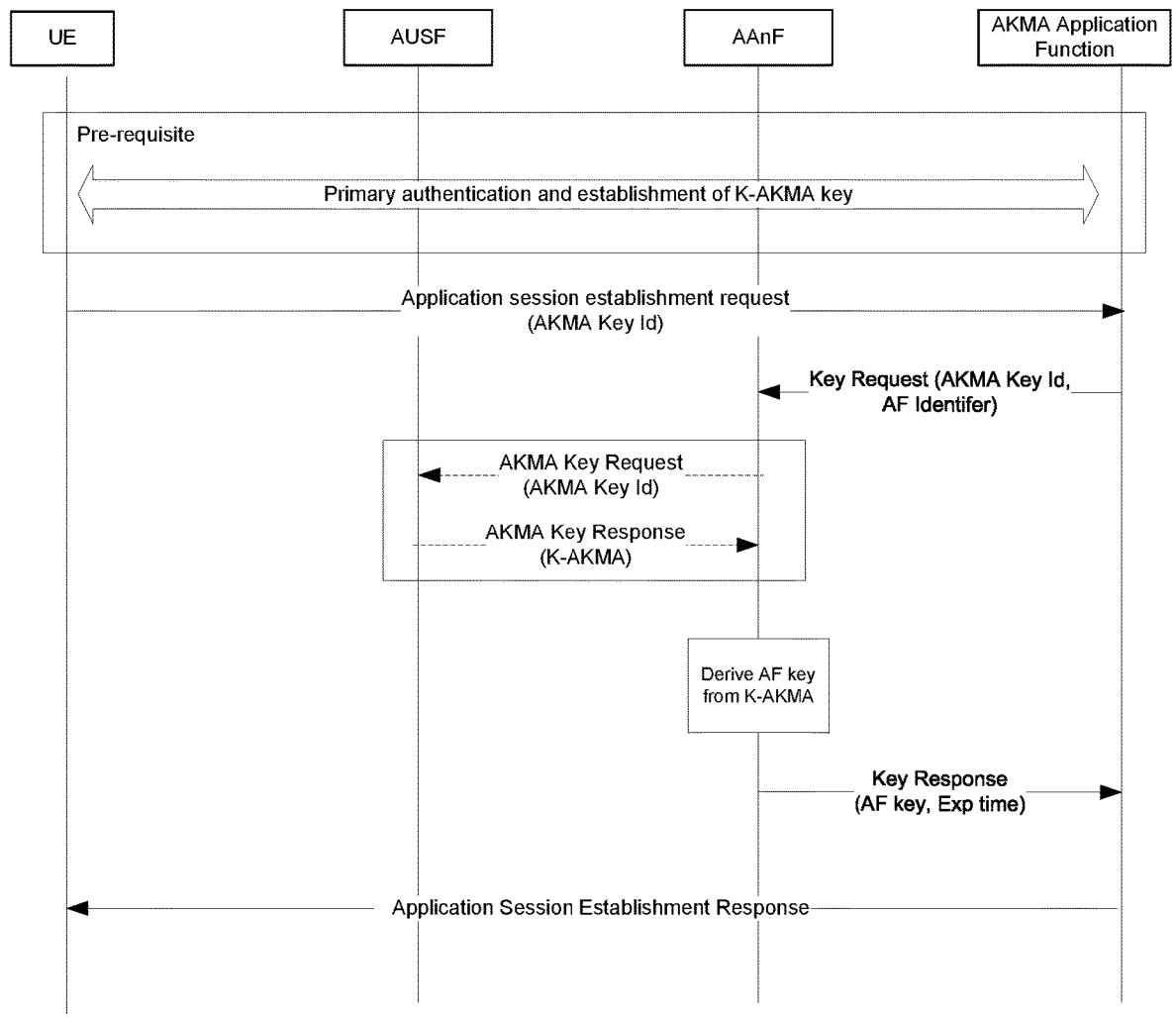
FIG. 3 shows an example of application function (AF) key generation from AKMA anchor key ($K_{AKMA}$).

FIG. 3 shows an example of application function (AF) key generation from AKMA anchor key (KAKMA).

In some implementations, the UE includes the derived AKMA key identifier in the message to initiate communication with the AKMA application function (AKMA AF). If the AKMA application function (AApF) does not have an active context associated with the key identifier, then the AF sends a request to the AKMA anchor function (AAnF) with the key identifier to request application function specific AKMA keys for the UE. The AF also includes its identity (AF Id) in the request.

If the AKMA anchor function (AAnF) is in possession of the application function (AF) specific key (KAF), it responds to the AF with the KAF key. If not, the AKMA anchor function (AAnF) checks if it has the UE specific KAKMA key identified by the AKMA key identifier. If the AKMA anchor key (KAKMA) is available in the AKMA anchor function (AAnF), it derives the AF specific AKMA key (KAF) from the AKMA anchor key (KAKMA) and respond to the application function (AF) with the AF specific key (KAF) and lifetime.

If the AKMA anchor key (KAKMA) is not available, the AKMA anchor function (AAnF) sends a request, including the AKMA key identifier, to the authentication server function (AUSF) to obtain the AKMA anchor key (KAKMA) specific to the user equipment (UE). The authentication server function (AUSF) responds with the KAKMA key identified by the key identifier. The AKMA anchor function (AAnF) derives the application function (AF) specific key (KAF) from the AKMA anchor key (KAKMA) and responds to the application function (AF) with the AF specific key (KAF) and lifetime.

Some embodiments of the disclosed technology may be used to improve the process for establishing secure communications to protect the application session between the UE and the AKMA application function. In some implementations, an application session establishment process can be conducted using an authentication and key management for application (AKMA) identifier (ID).

Figure 4:
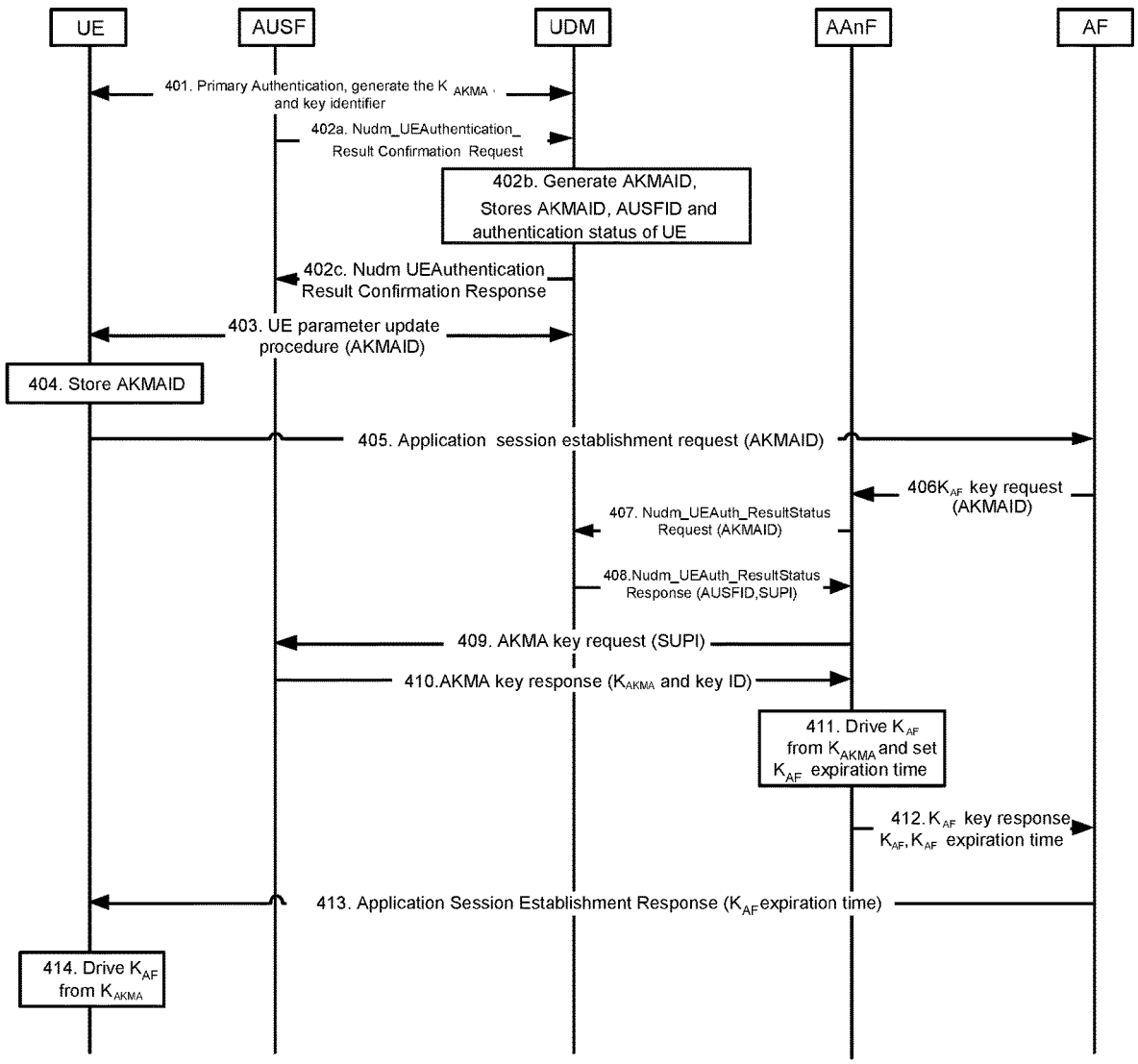
FIG. 4 is a flowchart illustrating an example process performed by components of a communication system, based on some embodiments of the disclosed technology.

FIG. 4 is a flowchart illustrating an example process performed by components of a communication system, based on some embodiments of the disclosed technology.

In some embodiments of the disclosed technology, a data management function such as a unified data management entity (UDM) may generate an authentication and key management for applications (AKMA) identifier (AKMAID) for the application session establishment process which can be used to identify AKMA procedures for the UE or can be used as an identifier to identify the AKMA anchor key. In some implementations, the AKMA identifier (AKMAID) may include, among other things, a mobile country code (MCC), a mobile network code (MNC), a routing indicator, and a random number (RAND). In some implementations, the AKMA identifier (AKMAID) may include, among other things, a mobile country code (MCC), a mobile network code (MNC), a routing indicator, a user equipment (UE) identifier (such as the Generic Public Subscription Identifier (GPSI) or other UE identifier), and a random number (RAND). Here and after, UE identifier is used to identify a user equipment. In some implementations, the AKMA identifier (AKMAID) may include, among other things, a mobile country code (MCC), a mobile network code (MNC), an authentication server function identifier, and a random number (RAND). In some implementations, the AKMA identifier (AKMAID) may include, among other things, a mobile country code (MCC), a mobile network code (MNC), an authentication server function identifier, a user equipment (UE) identifier (such as the Generic Public Subscription Identifier (GPSI) or other UE identifier), and a random number (RAND). In some implementations, the AKMA identifier (AKMAID) may include, among other things, a mobile country code (MCC), a mobile network code (MNC), a routing indicator, an authentication and key management for applications anchor function (AAnF) identifier, and a random number (RAND). In some implementations, the AKMA identifier (AKMAID) may include, among other things, a mobile country code (MCC), a mobile network code (MNC), a routing indicator, an authentication and key management for applications anchor function (AAnF) identifier, UE identifier (such as the Generic Public Subscription Identifier (GPSI) or other UE identifier), and a random number (RAND). In some implementations, the AKMA identifier (AKMAID) may include, among other things, a mobile country code (MCC), a mobile network code (MNC), an authentication server function identifier, an authentication and key management for applications anchor function (AAnF) identifier, and a random number (RAND). In some implementations, the AKMA identifier (AKMAID) may include, among other things, a mobile country code (MCC), a mobile network code (MNC), an authentication server function identifier, an authentication and key management for applications anchor function (AAnF) identifier, UE identifier (such as the Generic Public Subscription Identifier (GPSI) or other UE identifier), and a random number (RAND). Here RAND may be generated by base64encode (RAND).

In some embodiments of the disclosed technology, after a successful primary authentication, the unified data management entity (UDM) generates and stores an AKMA identifier (AKMAID) that includes MCC, MNC, routing indicator, and RAND, where the MCC identifies uniquely the country, the MNC identifies the home public land mobile network (HPLMN), the routing indicator is used for route network signaling with AKMAID to unified data management (UDM) instances, and RAND is a random number that the UDM allocates to the UE.

In some embodiments of the disclosed technology, the UDM is configured to perform UE parameter update (UPU) procedures and send the AKMAID as UE parameter update (UPU) data to the UE through the UE parameters update (UPU) procedure.

In some embodiments of the disclosed technology, the UE is configured to use the AKMAID for application session establishment.

As shown in FIG. 4, an application session establishment based on some embodiments of the disclosed technology may include a plurality of processes 401-414.

At 401, a successful 5G primary authentication results in an authentication server function key ($K_{AUSF}$) being stored at an authentication server function entity (AUSF) and the user equipment (UE). The UE and the AUSF generate the AKMA Anchor Key ($K_{AKMA}$) and the associated key identifier as part of the UE registration procedure. Here, the $K_{AKMA}$ can be derived from the $K_{AUSF}$.

At 402a, the AUSF informs a unified data management (UDM) about the result and time of an authentication procedure with a user equipment (UE) using a service-based interface request such as Nudm_UE Authentication_Result Confirmation Request. This includes a subscription permanent identifier (SUPI), a timestamp of the authentication, the authentication type (e.g. EAP method or 5G-AKA), and the serving network name.

At 402b, the UDM generates, for the UE, an AKMA identifier (AKMAID) implemented based on some embodiments of the disclosed technology. The AKMAID is an identifier used by the UE for subsequent requests towards the application function entities (AFs). The AKMAID can only be refreshed by running a fresh primary authentication. This means that the AKMAID lifetime(s) cannot be shorter than the time interval between primary authentications. In some embodiments of the disclosed technology, the AKMAID can include MCC, MNC, Routing Indicator, and RAND, where MCC (mobile country code) identifies uniquely the country, MNC (mobile network code) identifies the home PLMN (Public Land Mobile Network), Routing Indicator is used to route network signaling with AKMAID to UDM instances, RAND is a random number that UDM allocated to UE (e.g., RANDom number, which is used for authentication). The UDM stores the AKMAID and an authentication server function identifier (AUSFID) with the authentication status of the UE (e.g., subscription permanent identifier (SUPI), authentication result, timestamp, and the serving network name).

At 402c, the UDM replies to the AUSF with a service-based interface response such as Nudm_UE Authentication_ Result Confirmation Response.

At 403, the UDM performs the UE parameter update (UPU) procedure and sends the AKMAID as user equipment parameter update (UPU) data to the UE through the UE parameters update procedure.

At 404, the UE receives and stores the AKMAID with the $K_{AKMA}$ and $K_{AKMA}$ identifier.

At 405, the UE starts communication with the AF with an application session establishment request, and in some embodiments of the disclosed technology the application session establishment request includes the AKMAID.

At 406, the application function entity (AF) sends key requests to the AKMA anchor function entity (AAnF) with the AKMAID received from the UE to request the AF specific key for the UE. The AF also includes its identity (AF Identifier) in the request.

At 407, the AAnF checks if it has the UE specific $K_{AKMA}$ key based on the AKMAID. If $K_{AKMA}$ is available in the AAnF, the AAnF proceeds to 411. If $K_{AKMA}$ is not available, the AAnF sends a service-based interface request such as Nudm_UEAuth_ResultStatus Request to the UDM to retrieve the identifier of the latest AUSF that authenticated the UE and the SUPI of the UE. The AAnF provides the AKMAID.

At 408, the UDM retrieves the information of the identifier of an authentication server function (AUSF) instance that has authenticated the UE and the SUPI of the UE based on the AKMAID. The UDM sends a service-based interface such as Nudm_UEAuth_ResultStatus Response including the AUSF instance identifier of the last AUSF which has reported a successful primary authentication to the UDM and the UE subscription permanent identifier (SUPI).

At 409, the AAnF sends the key request to the AUSF by providing the UE SUPI.

At 410, the AUSF retrieves an AKMA anchor key ($K_{AKMA}$) and $K_{AKMA}$ identifier according to SUPI, and then sends $K_{AKMA}$ and $K_{AKMA}$ identifier to the AAnF. The AAnF receives and stores the $K_{AKMA}$ and the $K_{AKMA}$ identifier with AKMAID.

At 411, the AAnF derives an application key ($K_{AF}$) based on the $K_{AKMA}$. The AAnF may set the $K_{AF}$ expiration time.

At 412, the AAnF sends the key response information to the AF. It includes an AAnF ID, the $K_{AF}$ and the key expiration time. Here, the AAnF ID indicates the identity of the AAnF.

At 413, the AF sends an Application session establishment response information to UE. The response information could include the $K_{AF}$ key expiration time.

At 414, the UE derives $K_{AF}$ based on $K_{AKMA}$.

Figure 5:
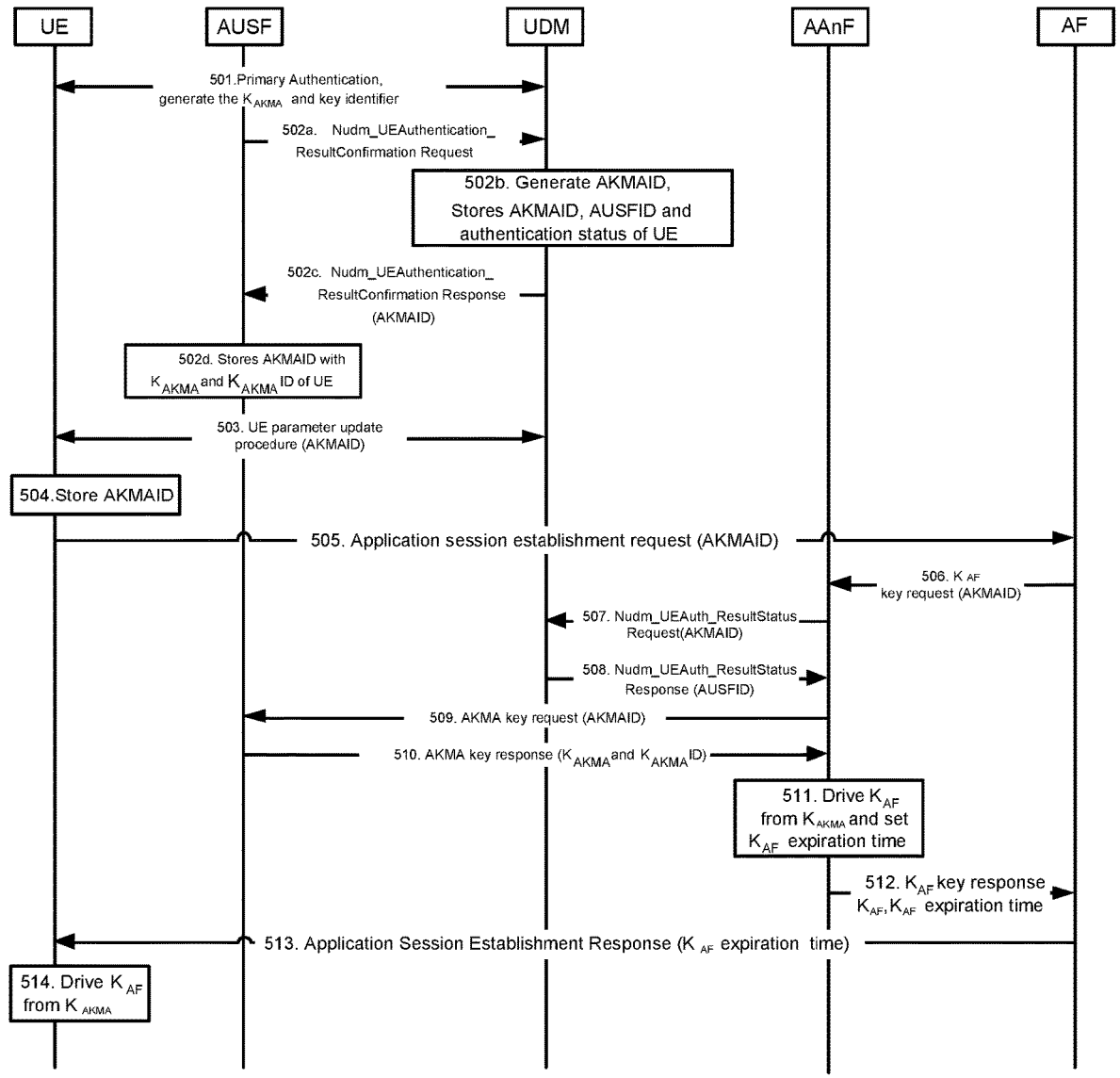
FIG. 5 is a flowchart illustrating another example process performed by components of a communication system, based on some embodiments of the disclosed technology.

FIG. 5 is a flowchart illustrating another example process performed by components of a communication system, based on some embodiments of the disclosed technology.

In some embodiments of the disclosed technology, a data management function such as a unified data management entity (UDM) may generate an AKMA identifier (AKMAID) for the application session establishment process which can be used to identify AKMA procedures for UE, or can be used as an identifier to identify the AKMA anchor key. In some implementations, the AKMA identifier (AKMAID) may include, among other things, a mobile country code (MCC), a mobile network code (MNC), a routing indicator, and a random number (RAND) for authentication. In some implementations, the AKMA identifier (AKMAID) may include, among other things, a mobile country code (MCC), a mobile network code (MNC), an authentication server function identifier, and a random number (RAND). In some implementations, the AKMA identifier (AKMAID) may include, among other things, a mobile country code (MCC), a mobile network code (MNC), a routing indicator, an authentication and key management for applications anchor function (AAnF) identifier, and a random number (RAND). In some implementations, the AKMA identifier (AKMAID) may include, among other things, a mobile country code (MCC), a mobile network code (MNC), an authentication server function identifier, an authentication and key management for applications anchor function (AAnF) identifier, and a random number (RAND).

In some embodiments of the disclosed technology, after a successful primary authentication, the unified data management entity (UDM) generates and stores an AKMA identifier (AKMAID) that includes MCC, MNC, routing indicator, and RAND, where the MCC identifies uniquely the country, the MNC identifies the home public land mobile network (HPLMN), the routing indicator is used for route network signaling with AKMAID to unified data management (UDM) instances, and RAND is a random number that the UDM has allocated to the UE.

In some embodiments of the disclosed technology, the UDM is configured to send the AKMA identifier (AKMAID) to an authentication server function entity (AUSF), and the AUSF is configured to store the AKMAID. The UDM performs the UE parameters update (UPU) procedure and sends the AKMAID as user equipment parameter update (UPU) data to the UE through a UE parameter update procedure. The UE uses the AKMAID in its application session establishment process.

As shown in FIG. 5, an application session establishment based on some embodiments of the disclosed technology may include a plurality of processes 501-514.

At 501, a successful 5G primary authentication results in an authentication server function key ($K_{AUSF}$) being stored at the authentication server function entity (AUSF) and the UE. The UE and the AUSF generate an AKMA anchor key ($K_{AKMA}$) and the associated key identifier as part of the UE registration procedure. Here, the $K_{AKMA}$ can be derived from the $K_{AUSF}$.

At 502a, the AUSF informs a unified data management (UDM) about the result and time of an authentication procedure with a user equipment (UE) using a service-based interface request such as Nudm_UE Authentication_Result Confirmation Request. This includes a subscription permanent identifier (SUPI), a timestamp of the authentication, the authentication type (e.g. EAP method or 5G-AKA), and the serving network name.

At 502b, the UDM generates, for the UE, an AKMA identifier (AKMAID) implemented based on some embodiments of the disclosed technology. The AKMAID is an identifier used by the UE for subsequent requests towards the application function entities (AFs). The AKMAID can only be refreshed by running a fresh primary authentication. This means that the AKMAID lifetime(s) cannot be shorter than the time interval between primary authentications. In some embodiments of the disclosed technology, the AKMAID can include MCC, MNC, Routing Indicator, and RAND, where MCC (mobile country code) identifies uniquely the country, MNC (mobile network code) identifies the home PLMN (Public Land Mobile Network), the Routing Indicator is used to route network signaling with AKMAID to UDM instances, RAND is a random number that the UDM has allocated to UE (e.g., RANDom number, which is used for authentication). The UDM stores the AKMAID and the authentication server function identifier (AUSFID) with the authentication status of the UE (e.g., subscription permanent identifier (SUPI), authentication result, timestamp, and the serving network name).

At 502c, the UDM replies to the AUSF with a service-based interface response such as Nudm_UE Authentication_Result Confirmation Response including the AKMAID.

At 502d, the AUSF receives and stores the AKMAID with $K_{AKMA}$ and $K_{AKMA}$ identifier of the UE.

At 503, the UDM performs the UE parameters update (UPU) procedure and sends the AKMAID as user equipment parameter update (UPU) data to the UE through the UE parameters update procedure.

At 504, the UE receives and stores the AKMAID with the $K_{AKMA}$ and $K_{AKMA}$ identifier.

At 505, the UE starts communication with the AF with an application session establishment request, and in some embodiments of the disclosed technology the application session establishment request includes the AKMAID.

At 506, the application function entity (AF) sends the key request to the AKMA anchor function entity (AAnF) with the AKMAID received from the UE to request the AF specific key for the UE. The AF also includes its identity (e.g., AF Identifier) in the request.

At 507, the AAnF checks if it has the UE specific $K_{AKMA}$ key based on the AKMAID. If $K_{AKMA}$ is available in the AAnF, the AAnF proceeds to 511. If $K_{AKMA}$ is not available, the AAnF sends a service-based interface request such as Nudm_UE Auth_ResultStatus Request to the UDM to retrieve the identifier of the latest AUSF that has authenticated the UE. The AAnF provides the AKMAID.

At 508, the UDM retrieves the information of the identifier of the AUSF instance that has authenticated the UE based on the AKMAID. The UDM sends a service-based interface response such as Nudm_UE Auth_ResultStatus Response including the AUSF instance identifier of the last AUSF which has reported a successful primary authentication to the UDM.

At 509, the AAnF sends the key request to the AUSF including AKMAID.

At 510, the AUSF retrieves $K_{AKMA}$ and $K_{AKMA}$ identifier according to the AKMAID, and then sends $K_{AKMA}$ and $K_{AKMA}$ identifier to the AAnF. The AAnF receives and stores $K_{AKMA}$ and $K_{AKMA}$ identifier with the AKMAID.

At 511, the AAnF derives the $K_{AF}$ based on the $K_{AKMA}$. The AAnF could set the $K_{AF}$ expiration time.

At 512, the AAnF sends the key response information to the AF. It includes an AAnF ID, the $K_{AF}$ and the key expiration time. Here, the AAnF ID indicates the identity of the AAnF.

At 513, the AF receives and stores the AAnF ID, $K_{AF}$ and the key expiration time with the AKMAID, and sends an application session establishment response information to the UE. The response information could include the KAF key expiration time.

At 514, the UE derives the $K_{AF}$ based on $K_{AKMA}$.

Figure 6:
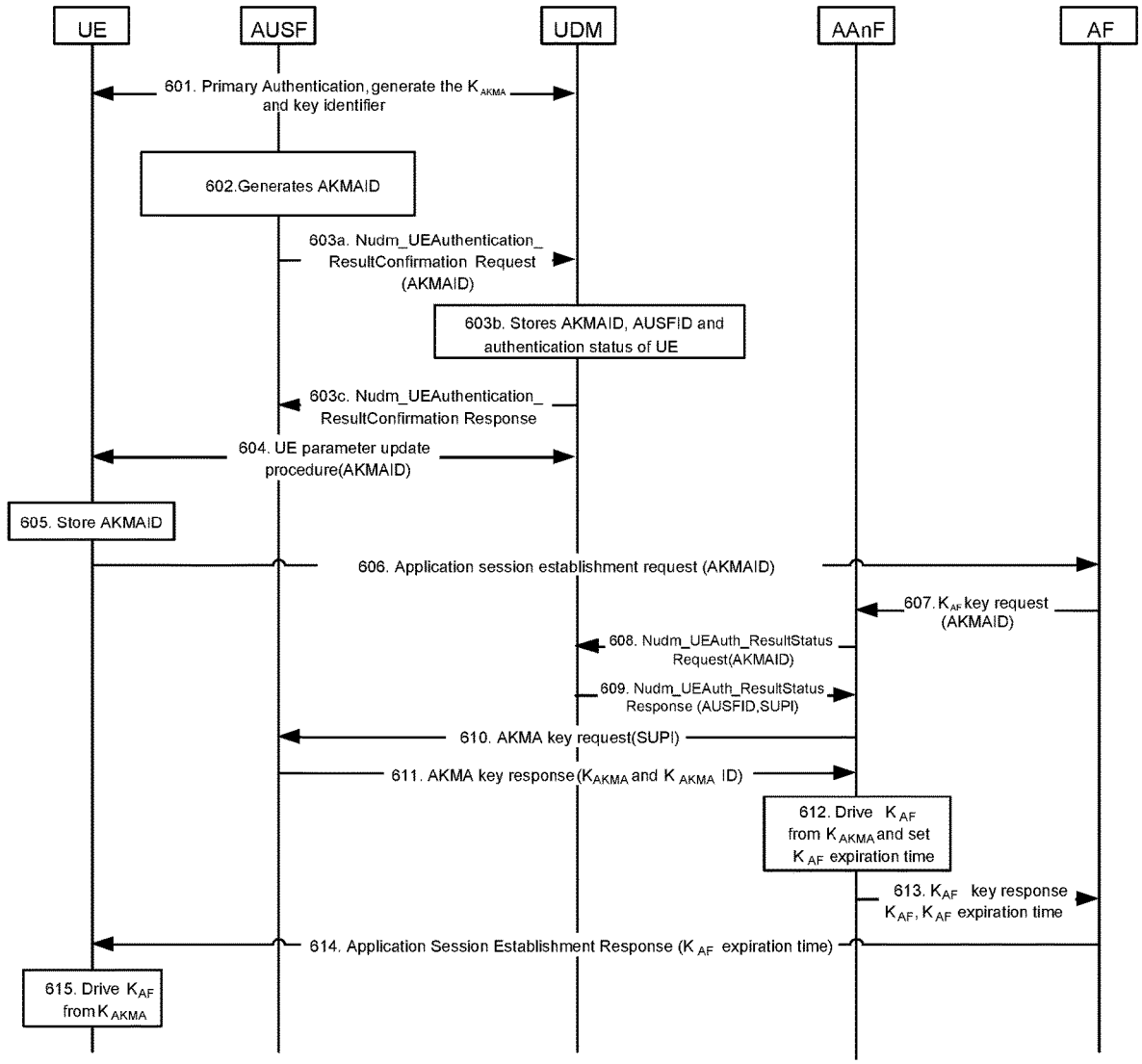
FIG. 6 is a flowchart illustrating yet another example process performed by components of a communication system, based on some embodiments of the disclosed technology.

FIG. 6 is a flowchart illustrating yet another example process performed by components of a communication system, based on some embodiments of the disclosed technology.

In some embodiments of the disclosed technology, a data management function such as an authentication server function entity (AUSF) generate an AKMA identifier (AKMAID) for the application session establishment process, which can be used to identify AKMA procedures for UE, or can be used as an identifier to identify the AKMA anchor key. In some implementations, the AKMA identifier (AKMAID) may include, among other things, a mobile country code (MCC), a mobile network code (MNC), a routing indicator, and a random number (RAND). In some implementations, the AKMA identifier (AKMAID) may include, among other things, a mobile country code (MCC), a mobile network code (MNC), a routing indicator, a user equipment (UE) identifier (such as the Generic Public Subscription Identifier (GPSI) or other UE identifier), and a random number (RAND). In some implementations, the AKMA identifier (AKMAID) may include, among other things, a mobile country code (MCC), a mobile network code (MNC), an authentication server function identifier, and a random number (RAND). In some implementations, the AKMA identifier (AKMAID) may include, among other things, a mobile country code (MCC), a mobile network code (MNC), an authentication server function identifier, a user equipment (UE) identifier (such as the Generic Public Subscription Identifier (GPSI) or other UE identifier), and a random number (RAND). In some implementations, the AKMA identifier (AKMAID) may include, among other things, a mobile country code (MCC), a mobile network code (MNC), a routing indicator, an authentication and key management for applications anchor function (AAnF) identifier, and a random number (RAND). In some implementations, the AKMA identifier (AKMAID) may include, among other things, a mobile country code (MCC), a mobile network code (MNC), a routing indicator, an authentication and key management for applications anchor function (AAnF) identifier, a user equipment (UE) identifier (such as the Generic Public Subscription Identifier (GPSI) or other UE identifier), and a random number (RAND). In some implementations, the AKMA identifier (AKMAID) may include, among other things, a mobile country code (MCC), a mobile network code (MNC), an authentication server function identifier, an authentication and key management for applications anchor function (AAnF) identifier, and a random number (RAND). In some implementations, the AKMA identifier (AKMAID) may include, among other things, a mobile country code (MCC), a mobile network code (MNC), an authentication server function identifier, an authentication and key management for applications anchor function (AAnF) identifier, a user equipment (UE) identifier (such as the Generic Public Subscription Identifier (GPSI) or other UE identifier), and a random number (RAND). Here RAND may be generated by base64encode (RAND).

In some embodiments of the disclosed technology, after a successful primary authentication, the AUSF generates an AKMA identifier (AKMAID) that includes MCC, MNC, routing indicator, and RAND, where the MCC identifies uniquely the country, the MNC identifies the home public land mobile network (HPLMN), the routing indicator is used to route network signaling with the AKMAID to unified data management (UDM) instances, and RAND is a random number that the AUSF has allocated to the UE.

In some embodiments of the disclosed technology, the AUSF is configured to send the AKMA identifier (AKMAID) to a unified data management entity (UDM), and the UDM stores the AKMAID.

The UDM performs the UE parameters update (UPU) procedure and sends the AKMAID as user equipment parameter update (UPU) data to the UE through a UE parameter update procedure. The UE uses the AKMAID in its application session establishment process.

As shown in FIG. 6, an application session establishment based on some embodiments of the disclosed technology may include a plurality of processes 601-615.

At 601, a successful 5G primary authentication results in an authentication server function key ($K_{AUSF}$) being stored at the AUSF and the UE. The UE and the AUSF generate the AKMA anchor key ($K_{AKMA}$) and the associated key identifier as part of the UE registration procedure. Here, the $K_{AKMA}$ can be derived from the $K_{AUSF}$.

At 602, the AUSF generates an AKMA identifier (AKMAID) for the UE. The AKMAID is an identifier used by the UE for subsequent requests towards the application function entities (AFs). The AKMAID can only be refreshed by running a fresh primary authentication. This means that the AKMAID lifetime(s) cannot be shorter than the time interval between primary authentications. In some embodiments of the disclosed technology, the AKMAID can include MCC, MNC, Routing Indicator, and RAND, where MCC (mobile country code) identifies uniquely the country, MNC (mobile network code) identifies the home PLMN (Public Land Mobile Network), Routing Indicator is used to route network signaling with AKMAID to UDM instances, RAND is a random number that the authentication server function entity (AUSF) has allocated to the UE.

At 603a, the AUSF informs a unified data management (UDM) about the result and time of an authentication procedure with a UE using a service-based interface request such as Nudm_UE Authentication_Result Confirmation Request. This includes a subscription permanent identifier (SUPI), a timestamp of the authentication, the authentication type (e.g. EAP method or 5G-AKA), the serving network name, and the AKMAID.

At 603b, the UDM stores the AKMAID and an AKMA identifier (AKMAID) with the authentication status of the UE (e.g., SUPI, authentication result, timestamp, and the serving network name).

At 603c, the UDM replies to the AUSF with a service-based interface response such as a Nudm_UEAuthentication_ResultConfirmation Response.

At 604, the UDM performs the UE parameters update (UPU) procedure and sends the AKMAID as user equipment parameter update (UPU) data to the UE through the UE parameters update procedure.

At 605, the UE receives and stores the AKMAID with the $K_{AKMA}$ and $K_{AKMA}$ identifier.

At 606, the UE starts communication with the AF with an application session establishment request, and in some embodiments of the disclosed technology the application session establishment request includes the AKMAID.

At 607, the AF sends the key request to the AAnF with the AKMAID received from the UE to request the AF specific key for the UE. The AF also includes its identity (e.g., AF Identifier) in the request.

At 608, the AAnF checks if it has the UE specific $K_{AKMA}$ key based on the AKMAID. If $K_{AKMA}$ is available in the AAnF, the AAnF proceeds to operation 612, which will be discussed below. If $K_{AKMA}$ is not available, the AAnF sends a service-based interface request such as Nudm_UE Auth_Result Status Request to the UDM to retrieve the identifier of the latest AUSF that has authenticated the UE and the SUPI of the UE. The AAnF provides the AKMAID.

At 609, the UDM retrieves the information of the identifier of the AUSF instance that authenticated the UE and the SUPI of the UE based on the AKMAID. The UDM sends a service-based interface response such as Nudm_UE Auth_Result Status Response including the AUSF instance identifier of the last AUSF which has reported a successful primary authentication to the UDM and the user equipment (UE) subscription permanent identifier (SUPI).

At 610, the AAnF sends the AKMA key request to the AUSF by providing the SUPI.

At 611, the AUSF retrieves $K_{AKMA}$ and $K_{AKMA}$ identifier according to the SUPI, and then sends $K_{AKMA}$ and $K_{AKMA}$ identifier to the AAnF. The AAnF receives and stores $K_{AKMA}$ and $K_{AKMA}$ identifier with AKMAID.

At 612, the AAnF derives the $K_{AF}$ based on the $K_{AKMA}$. The AAnF sets the $K_{AF}$ expiration time.

At 613, the AAnF sends the key response information to AF. It includes AAnF ID, $K_{AF}$ and the key expiration time. Here, the AAnF ID indicates the identity of the AAnF.

At 614, the AF receives and stores the AAnF ID, $K_{AF}$ and the key expiration time with AKMAID, and sends an application session establishment response information to the UE. The response information includes the $K_{AF}$ key expiration time.

At 615, the UE derives $K_{AF}$ based on $K_{AKMA}$.

Figure 7:
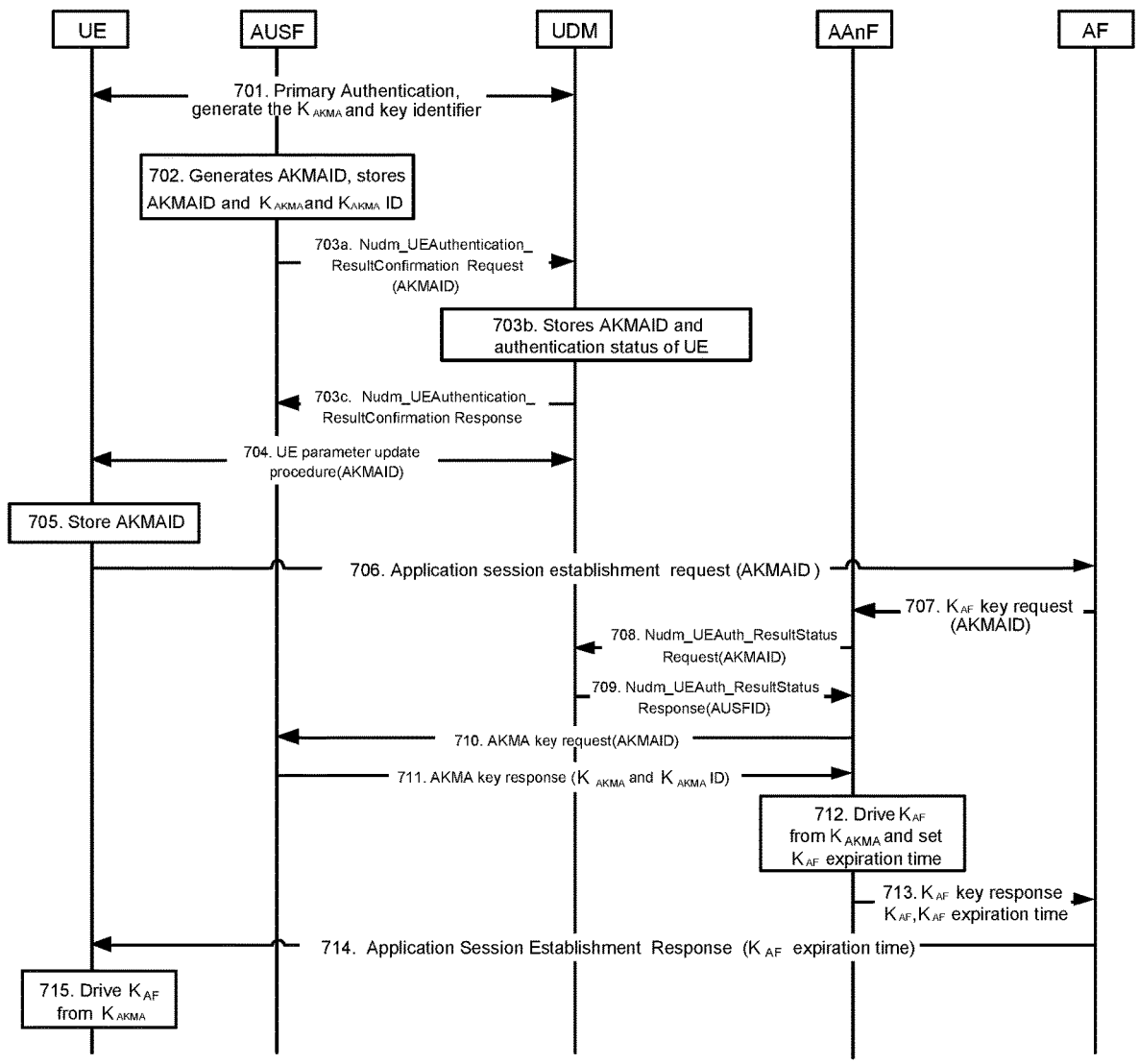
FIG. 7 is a flowchart illustrating yet another example process performed by components of a communication system, based on some embodiments of the disclosed technology.

FIG. 7 is a flowchart illustrating yet another example process performed by components of a communication system, based on some embodiments of the disclosed technology.

In some embodiments of the disclosed technology, a data management function such as an authentication server function entity (AUSF) generate an AKMA identifier (AKMAID) for the application session establishment process which can be used to identify AKMA procedures for UE, or which can be used as an identifier to identify the AKMA anchor key. In some implementations, the AKMA identifier (AKMAID) may include, among other things, a mobile country code (MCC), a mobile network code (MNC), a routing indicator, and a random number (RAND) for authentication. In some implementations, the AKMA identifier (AKMAID) may include, among other things, a mobile country code (MCC), a mobile network code (MNC), a routing indicator, a user equipment (UE) identifier (such as the Generic Public Subscription Identifier (GPSI) or other UE identifier), and a random number (RAND) for authentication. In some implementations, the AKMA identifier (AKMAID) may include, among other things, a mobile country code (MCC), a mobile network code (MNC), an authentication server function identifier, and a random number (RAND). In some implementations, the AKMA identifier (AKMAID) may include, among other things, a mobile country code (MCC), a mobile network code (MNC), an authentication server function identifier, a user equipment (UE) identifier (such as the Generic Public Subscription Identifier (GPSI) or other UE identifier), and a random number (RAND). In some implementations, the AKMA identifier (AKMAID) may include, among other things, a mobile country code (MCC), a mobile network code (MNC), a routing indicator, an authentication and key management for applications anchor function (AAnF) identifier, and a random number (RAND). In some implementations, the AKMA identifier (AKMAID) may include, among other things, a mobile country code (MCC), a mobile network code (MNC), a routing indicator, an authentication and key management for applications anchor function (AAnF) identifier, a user equipment (UE) identifier (such as the Generic Public Subscription Identifier (GPSI) or other UE identifier), and a random number (RAND). In some implementations, the AKMA identifier (AKMAID) may include, among other things, a mobile country code (MCC), a mobile network code (MNC), an authentication server function identifier, an authentication and key management for applications anchor function (AAnF) identifier, and a random number (RAND).

In some implementations, the AKMA identifier (AKMAID) may include, among other things, a mobile country code (MCC), a mobile network code (MNC), an authentication server function identifier, an authentication and key management for applications anchor function (AAnF) identifier, a user equipment (UE) identifier (such as the Generic Public Subscription Identifier (GPSI) or other UE identifier), and a random number (RAND). Here RAND may be generated by base64encode (RAND).

In some embodiments of the disclosed technology, after a successful primary authentication, the AUSF generates and stores an AKMA identifier (AKMAID) that includes MCC, MNC, routing indicator, and RAND, where the MCC identifies uniquely the country, the MNC identifies the home public land mobile network (HPLMN), the routing indicator is used to route network signaling with the AKMAID to unified data management (UDM) instances, and RAND is a random number that the AUSF has allocated to the UE.

In some embodiments of the disclosed technology, the AUSF sends the AKMAID to a unified data management entity (UDM), and the UDM stores the AKMAID.

In some embodiments of the disclosed technology, the UDM performs the UE parameter update (UPU) procedure and sends the AKMAID as user equipment parameter update (UPU) data to the UE through the UE parameter update procedure. The UE uses AKMAID in its application session establishment process.

As shown in FIG. 7, an application session establishment based on some embodiments of the disclosed technology may include a plurality of operations 701-715.

At 701, a successful 5G primary authentication results in an authentication server function key ($K_{AUSF}$) being stored at the AUSF and the UE. The UE and the AUSF generates the AKMA Anchor Key ($K_{AKMA}$) and the associated key identifier as part of the UE registration procedure. The $K_{AKMA}$ can be derived from $K_{AUSF}$.

At 702, the authentication server function entity (AUSF) generates an AKMA identifier (AKMAID) for the UE. The AKMAID is an identifier used by the UE for subsequent requests towards application function entities (AFs). The AKMAID can only be refreshed by running a fresh primary authentication. This means that the AKMAID lifetime(s) cannot be shorter than the time interval between primary authentications. In some implementations, the AKMA identifier (AKMAID) may include, among other things, a mobile country code (MCC), a mobile network code (MNC), a routing indicator, and a random number (RAND). Here, the MCC identifies uniquely the country, the MNC identifies the home PLMN, the routing indicator is used to route network signaling with the AKMAID to the UDM instances, the RAND is a random number that the AUSF has allocated to the UE. The AUSF stores the AKMAID with the $K_{AKMA}$ and $K_{AKMA}$ identifier.

At 703a, the AUSF informs the UDM about the result and time of an authentication procedure with a UE using a service-based interface request such as Nudm_UE Authentication_Result Confirmation Request. This includes the SUPI, a timestamp of the authentication, the authentication type (e.g. EAP method or 5G-AKA), the serving network name, and the AKMAID.

At 703b, the UDM stores the AKMAID and an authentication server function identifier (AUSFID) with the authentication status of the UE (e.g., SUPI, authentication result, timestamp, and the serving network name).

At 703c, the UDM replies to AUSF with a service-based interface response such as Nudm_UE Authentication_Result Confirmation Response.

At 704, the UDM performs the user equipment parameter update (UPU) procedure and sends the AKMAID as user equipment parameter update (UPU) data to the UE through the UE parameter update procedure.

At 705, the UE receives and stores the AKMAID with the $K_{AKMA}$ and the $K_{AKMA}$ identifier.

At 706, the UE starts communication with the AF with an application session establishment request that includes the AKMAID.

At 707, the AF sends the key request to the AAnF with the AKMAID received from the UE to request an AF specific key for the UE. The AF also includes its identity (e.g., AF identifier) in the request.

At 708, the AAnF checks if it has the UE specific $K_{AKMA}$ key based on the AKMAID. If the $K_{AKMA}$ is available in the AAnF, the AAnF proceeds to operation 712, which will be discussed below. If $K_{AKMA}$ is not available, the AAnF sends a service-based interface request such as Nudm_UE Auth_Result Status Request to the UDM to retrieve the identifier of the latest AUSF that has authenticated the UE. The AAnF provides the AKMAID.

At 709, the UDM retrieves the information of the identifier of the AUSF instance that has authenticated the UE based on the AKMAID. The UDM sends a service-based interface response such as Nudm_UE Auth_Result Status Response including the AUSF instance identifier of the last AUSF which has reported a successful primary authentication to the UDM.

At 710, the AAnF sends the AKMA key request to the AUSF by providing the AKMAID.

At 711, the AUSF retrieves $K_{AKMA}$ and $K_{AKMA}$ identifier according to the AKMAID, and then sends $K_{AKMA}$ and $K_{AKMA}$ identifier to the AAnF. The AAnF receives and stores $K_{AKMA}$ and $K_{AKMA}$ identifier with the AKMAID.

At 712, the AAnF derives $K_{AF}$ based on $K_{AKMA}$. The AAnF could set the $K_{AF}$ expiration time.

At 713, the AAnF sends the key response information to AF. It includes AAnF ID, $K_{AF}$ and the key expiration time.

At 714, the AF receives and stores the AAnF ID, KAF and the key expiration time with AKMAID, and sends an application session establishment response information to the UE. The response information includes the $K_{AF}$ key expiration time.

At 715, the UE derives $K_{AF}$ based on $K_{AKMA}$.

Figure 8:
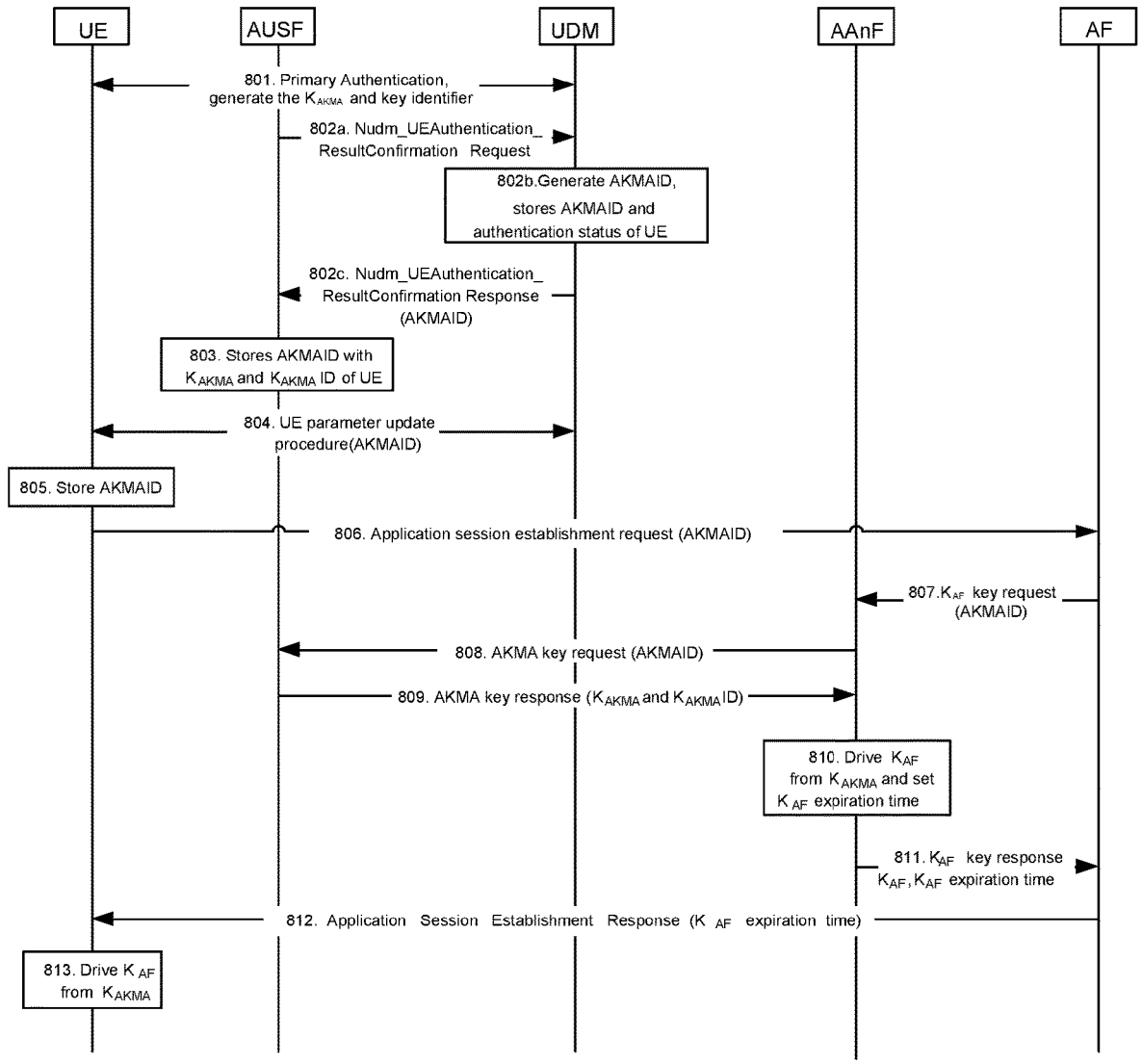
FIG. 8 is a flowchart illustrating yet another example process performed by components of a communication system, based on some embodiments of the disclosed technology.

FIG. 8 is a flowchart illustrating yet another example process performed by components of a communication system, based on some embodiments of the disclosed technology.

As shown in FIG. 8, an application session establishment based on some embodiments of the disclosed technology may include a plurality of operations 801-813.

At 801, a successful 5G primary authentication results in an authentication server function key ($K_{AUSF}$) being stored at an authentication server function entity (AUSF) and a user equipment (UE). The UE and the AUSF generate the AKMA anchor key ($K_{AKMA}$) and the associated key identifier as part of the UE registration procedure. In some implementations, the $K_{AKMA}$ can be derived from $K_{AUSF}$.

At 802a, the AUSF informs a unified data management (UDM) about the result and time of an authentication procedure with a UE using a service-based interface request such as Nudm_UE Authentication_Result Confirmation Request. This includes the SUPI, a timestamp of the authentication, the authentication type (e.g. EAP method or 5G-AKA), and the serving network name.

In some embodiments of the disclosed technology, a data management function such as a unified data management entity (UDM) may generate an authentication and key management for applications (AKMA) identifier (AKMAID) for the application session establishment process which can be used to identify AKMA procedures for UE, or which can be used as an identifier to identify the AKMA anchor key. In some implementations, the AKMA identifier (AKMAID) may include, among other things, a combination of a mobile country code (MCC), a mobile network code (MNC), an authentication server function identifier (AUSFID), and a random number (RAND), or a combination of a mobile country code (MCC), a mobile network code (MNC), a routing indicator, and a random number (RAND). In some implementations, the AKMA identifier (AKMAID) may include, among other things, a combination of a mobile country code (MCC), a mobile network code (MNC), an authentication server function identifier (AUSFID), a user equipment (UE) identifier (such as the Generic Public Subscription Identifier (GPSI) or other UE identifier), and a random number (RAND), or a combination of a mobile country code (MCC), a mobile network code (MNC), a routing indicator, a user equipment (UE) identifier (such as the Generic Public Subscription Identifier (GPSI) or other UE identifier), and a random number (RAND). In some implementations, the AKMA identifier (AKMAID) may include, among other things, a mobile country code (MCC), a mobile network code (MNC), a routing indicator, an authentication and key management for applications anchor function (AAnF) identifier, and a random number (RAND). In some implementations, the AKMA identifier (AKMAID) may include, among other things, a mobile country code (MCC), a mobile network code (MNC), a routing indicator, an authentication and key management for applications anchor function (AAnF) identifier, a user equipment (UE) identifier (such as the Generic Public Subscription Identifier (GPSI) or other UE identifier), and a random number (RAND). In some implementations, the AKMA identifier (AKMAID) may include, among other things, a mobile country code (MCC), a mobile network code (MNC), an authentication server function identifier, an authentication and key management for applications anchor function (AAnF) identifier, and a random number (RAND). In some implementations, the AKMA identifier (AKMAID) may include, among other things, a mobile country code (MCC), a mobile network code (MNC), an authentication server function identifier, an authentication and key management for applications anchor function (AAnF) identifier, a user equipment (UE) identifier (such as the Generic Public Subscription Identifier (GPSI) or other UE identifier), and a random number (RAND). Here RAND may be generated by base64encode (RAND).

In some embodiments of the disclosed technology, after a successful primary authentication, the unified data management entity (UDM) generate and store an AKMA identifier (AKMAID) that includes a combination of a mobile country code (MCC), a mobile network code (MNC), an authentication server function identifier (AUSFID), and a random number (RAND), or a combination of a mobile country code (MCC), a mobile network code (MNC), a routing indicator, and a random number (RAND). In some embodiments of the disclosed technology, after a successful primary authentication, the unified data management entity (UDM) generate and store an AKMA identifier (AKMAID) that includes a combination of a mobile country code (MCC), a mobile network code (MNC), an authentication server function identifier (AUSFID), a user equipment (UE) identifier (such as the Generic Public Subscription Identifier (GPSI) or other UE identifier), and a random number (RAND), or a combination of a mobile country code (MCC), a mobile network code (MNC), a routing indicator, a user equipment (UE) identifier (such as the Generic Public Subscription Identifier (GPSI) or other UE identifier), and a random number (RAND). In some implementations, the AKMA identifier (AKMAID) may include, among other things, a mobile country code (MCC), a mobile network code (MNC), a routing indicator, an authentication and key management for applications anchor function (AAnF) identifier, and a random number (RAND). In some implementations, the AKMA identifier (AKMAID) may include, among other things, a mobile country code (MCC), a mobile network code (MNC), a routing indicator, an authentication and key management for applications anchor function (AAnF) identifier, a user equipment (UE) identifier (such as the Generic Public Subscription Identifier (GPSI) or other UE identifier), and a random number (RAND). In some implementations, the AKMA identifier (AKMAID) may include, among other things, a mobile country code (MCC), a mobile network code (MNC), an authentication server function identifier, an authentication and key management for applications anchor function (AAnF) identifier, and a random number (RAND). In some implementations, the AKMA identifier (AKMAID) may include, among other things, a mobile country code (MCC), a mobile network code (MNC), an authentication server function identifier, an authentication and key management for applications anchor function (AAnF) identifier, a user equipment (UE) identifier (such as the Generic Public Subscription Identifier (GPSI) or other UE identifier), and a random number (RAND). Here, the MCC identifies uniquely the country, the MNC identifies the home PLMN, the AUSFID is the identifier of the AUSF, the RAND is a random number that the UDM has allocated to the UE, and the routing indicator is used to route network signaling with the AKMAID to AUSF instances. Here RAND may be generated by base64encode (RAND).

In some embodiments of the disclosed technology, the UDM is configured to send the AKMAID to the AUSF, and the AUSF stores the AKMAID.

The UDM performs the UE parameter Update (UPU) procedure and sends the AKMAID as UPU data to the UE through UE parameters update procedure.

In some embodiments of the disclosed technology, the UE uses the AKMAID in its application session establishment process.

At 802b, the UDM generates, for the UE, an AKMA identifier (AKMAID) implemented based on some embodiments of the disclosed technology. The AKMAID is an identifier used by UE for subsequent requests towards the application function entities (AFs). The AKMAID can only be refreshed by running a fresh primary authentication. This means that the AKMAID lifetime(s) cannot be shorter than the time interval between primary authentications. In an embodiment of the disclosed technology, the AKMAID can include MCC, MNC, AUSFID, and RAND, where MCC identifies uniquely the country, MNC identifies the home PLMN, AUSFID is the identifier of AUSF, RAND is a random number that UDM allocated to UE. In another embodiment of the disclosed technology, the AKMAID can include MCC, MNC, Routing Indicator, and RAND, where MCC identifies uniquely the country, MNC identifies the home PLMN, Routing Indicator is used to route network signaling with AKMAID to AUSF instances, RAND is a random number that UDM allocated to UE. The UDM stores the AKMAID with the authentication status of the UE (SUPI, authentication result, timestamp, and the serving network name).

At 802c, the UDM replies to the AUSF with a service-based interface response such as Nudm_UE Authentication_Result Confirmation Response including the AKMAID.

At 803, the AUSF receives and stores the AKMAID with $K_{AKMA}$ and $K_{AKMA}$ identifier.

At 804, the UDM performs the UE parameter update (UPU) procedure and sends the AKMAID as user equipment parameter update (UPU) data to the UE through the UE parameter update procedure.

At 805, the UE receives and stores the AKMAID with the $K_{AKMA}$ and $K_{AKMA}$ identifier.

At 806. The UE starts communication with the AF with an application session establishment request. The request includes AKMAID.

At 807, the AF sends the key request to the AAnF with the AKMAID received from the UE to request the AF specific key for the UE. The AF also includes its identity (AF Identifier) in the request.

At 808, the AAnF checks if it has the UE specific $K_{AKMA}$ key based on the AKMAID. If the $K_{AKMA}$ is available in the AAnF, the AAnF proceeds to operation 810, which will be discussed below. If the $K_{AKMA}$ is not available, the AAnF sends the key request to the AUSF including the AKMAID.

At 809, the AUSF retrieves $K_{AKMA}$ and $K_{AKMA}$ identifier according to the AKMAID, and then sends $K_{AKMA}$ and $K_{AKMA}$ identifier to AAnF. The AAnF receives and stores $K_{AKMA}$ and $K_{AKMA}$ identifier with the AKMAID.

At 810, the AAnF derives the $K_{AF}$ based on the $K_{AKMA}$. The AAnF sets the $K_{AF}$ expiration time.

At 811, AAnF sends the key response information to AF. It includes AAnF ID, $K_{AF}$ and the key expiration time. Here, the AAnF ID indicates the identity of the AAnF.

At 812, the AF receives and stores the AAnF ID, KAF and the key expiration time with AKMAID, and sends an application session establishment response information to the UE. The response information could include the $K_{AF}$ key expiration time.

At 813, the UE derives $K_{AF}$ based on $K_{AKMA}$.

Figure 9:
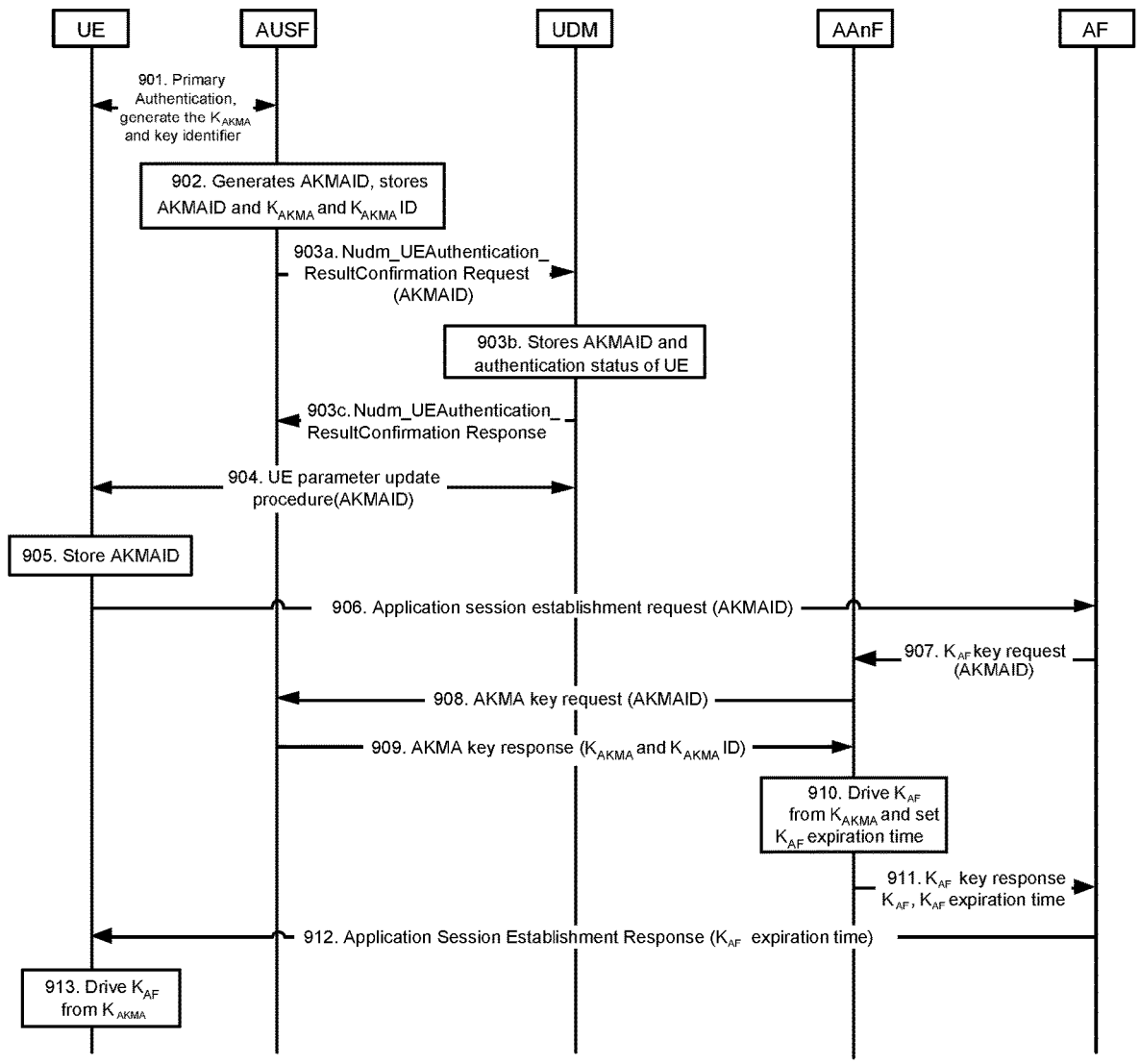
FIG. 9 is a flowchart illustrating yet another example process performed by components of a communication system, based on some embodiments of the disclosed technology.

FIG. 9 is a flowchart illustrating yet another example process performed by components of a communication system, based on some embodiments of the disclosed technology.

In some embodiments of the disclosed technology, a data management function such as an authentication server function entity (AUSF) may generates an AKMA identifier (AKMAID) for the application session establishment process which can be used to identify AKMA procedures for UE, or which can be used as an identifier to identify the AKMA anchor key. In some implementations, the AKMA identifier (AKMAID) may include, among other things, a combination of a mobile country code (MCC), a mobile network code (MNC), an authentication server function identifier (AUSFID), and a random number (RAND), or a combination of a mobile country code (MCC), a mobile network code (MNC), a routing indicator, and a random number (RAND). In some implementations, the AKMA identifier (AKMAID) may include, among other things, a combination of a mobile country code (MCC), a mobile network code (MNC), an authentication server function identifier (AUSFID), a user equipment (UE) identifier (such as the Generic Public Subscription Identifier (GPSI) or other UE identifier), and a random number (RAND), or a combination of a mobile country code (MCC), a mobile network code (MNC), a routing indicator, a user equipment (UE) identifier (such as the Generic Public Subscription Identifier (GPSI) or other UE identifier), and a random number (RAND). In some implementations, the AKMA identifier (AKMAID) may include, among other things, a mobile country code (MCC), a mobile network code (MNC), a routing indicator, an authentication and key management for applications anchor function (AAnF) identifier, and a random number (RAND). In some implementations, the AKMA identifier (AKMAID) may include, among other things, a mobile country code (MCC), a mobile network code (MNC), a routing indicator, an authentication and key management for applications anchor function (AAnF) identifier, a user equipment (UE) identifier (such as the Generic Public Subscription Identifier (GPSI) or other UE identifier), and a random number (RAND). In some implementations, the AKMA identifier (AKMAID) may include, among other things, a mobile country code (MCC), a mobile network code (MNC), an authentication server function identifier, an authentication and key management for applications anchor function (AAnF) identifier, and a random number (RAND). In some implementations, the AKMA identifier (AKMAID) may include, among other things, a mobile country code (MCC), a mobile network code (MNC), an authentication server function identifier, an authentication and key management for applications anchor function (AAnF) identifier, a user equipment (UE) identifier (such as the Generic Public Subscription Identifier (GPSI) or other UE identifier), and a random number (RAND). Here RAND may be generated by base64encode (RAND).

In some embodiments of the disclosed technology, after successful primary authentication, the AUSF generate and store the AKMAID including MCC, MNC, AUSFID, and RAND, where MCC identifies uniquely the country, MNC identifies the home PLMN, AUSFID is the identifier of the AUSF, RAND is a random number that UDM allocated to the UE. The AKMAID can also include MCC, MNC, Routing Indicator, and RAND, where MCC identifies uniquely the country, MNC identifies the home PLMN, Routing Indicator is used to route network signaling with the AKMAID to AUSF instances, RAND is a random number that UDM allocated to the UE. In some embodiments of the disclosed technology, after a successful primary authentication, the AUSF generate and store the AKMA identifier (AKMAID) that includes a combination of a mobile country code (MCC), a mobile network code (MNC), an authentication server function identifier (AUSFID), a user equipment (UE) identifier (such as the Generic Public Subscription Identifier (GPSI) or other UE identifier), and a random number (RAND), or a combination of a mobile country code (MCC), a mobile network code (MNC), a routing indicator, a user equipment (UE) identifier (such as the Generic Public Subscription Identifier (GPSI) or other UE identifier), and a random number (RAND). In some implementations, the AKMA identifier (AKMAID) may include, among other things, a mobile country code (MCC), a mobile network code (MNC), a routing indicator, an authentication and key management for applications anchor function (AAnF) identifier, and a random number (RAND). In some implementations, the AKMA identifier (AKMAID) may include, among other things, a mobile country code (MCC), a mobile network code (MNC), a routing indicator, an authentication and key management for applications anchor function (AAnF) identifier, a user equipment (UE) identifier (such as the Generic Public Subscription Identifier (GPSI) or other UE identifier), and a random number (RAND). In some implementations, the AKMA identifier (AKMAID) may include, among other things, a mobile country code (MCC), a mobile network code (MNC), an authentication server function identifier, an authentication and key management for applications anchor function (AAnF) identifier, and a random number (RAND). In some implementations, the AKMA identifier (AKMAID) may include, among other things, a mobile country code (MCC), a mobile network code (MNC), an authentication server function identifier, an authentication and key management for applications anchor function (AAnF) identifier, a user equipment (UE) identifier (such as the Generic Public Subscription Identifier (GPSI) or other UE identifier), and a random number (RAND). Here, the MCC identifies uniquely the country, the MNC identifies the home PLMN, the AUSFID is the identifier of the AUSF, the RAND is a random number that the UDM has allocated to the UE, and the routing indicator is used to route network signaling with the AKMAID to AUSF instances. Here RAND may be generated by base64encode (RAND).

In some embodiments of the disclosed technology, the AUSF sends the AKMAID to the UDM, and the UDM stores the AKMAID.

The UDM performs the UE Parameters Update (UPU) procedure and sends the AKMAID as UPU data to the UE through UE parameters update procedure. The UE uses the AKMAID for application session establishment.

As shown in FIG. 9, an application session establishment based on some embodiments of the disclosed technology may include a plurality of operations 901-913.

At 901, a successful 5G primary authentication results in an authentication server function key ($K_{AUSF}$) being stored at an authentication server function entity (AUSF) and a user equipment (UE). The UE and the AUSF generate the AKMA anchor key ($K_{AKMA}$) and the associated key identifier as part of the UE Registration procedure. In some implementations, the $K_{AKMA}$ can be derived from $K_{AUSF}$.

At 902, the AUSF generates an AKMA identifier (AKMAID) for the UE. The AKMAID is an identifier used by the UE for subsequent requests towards application function entities (AFs). The AKMAID can only be refreshed by running a fresh primary authentication. This means that the AKMAID lifetime(s) cannot be shorter than the time interval between primary authentications. In some embodiments of the disclosed technology, the AKMAID may include a combination of MCC, MNC, AUSFID, and RAND, where MCC identifies uniquely the country, MNC identifies the home public land mobile network (PLMN), AUSFID is the identifier of the authentication server function (AUSF), and RAND is a random number that the AUSF has allocated to the UE. The AKMAID can also include a combination of MCC, MNC, Routing Indicator, and RAND, where MCC identifies uniquely the country, MNC identifies the home PLMN, Routing Indicator is used to route network signaling with AKMAID to AUSF instances, RAND is a random number that the UDM has allocated to the UE. The AUSF stores the AKMAID with the $K_{AKMA}$ and $K_{AKMA}$ identifier.

At 903a, the AUSF informs the UDM about the result and time of an authentication procedure with a UE using a service-based interface request such as Nudm_UE Authentication_Result Confirmation Request. This includes the SUPI, a timestamp of the authentication, the authentication type (e.g. EAP method or 5G-AKA), the serving network name, and the AKMAID.

At 903b, the UDM stores the AKMAID with the authentication status of the UE (e.g., SUPI, authentication result, timestamp, and the serving network name).

At 903c, the UDM replies to AUSF with a service-based interface response such as Nudm_UE Authentication_Result Confirmation Response.

At 904, the UDM performs the UE parameter update (UPU) procedure and sends the AKMAID as UE parameter update (UPU) data to the UE through the UE parameter update procedure.

At 905, the UE receives and stores the AKMAID with the $K_{AKMA}$ and $K_{AKMA}$ identifier.

At 906, the UE starts communication with an application function entity (AF) with an application session establishment request, which includes AKMAID.

At 907, the AF sends the key request to the AAnF with the AKMAID received from the UE to request an AF specific key for the UE. The AF also includes its identity (AF Identifier) in the request.

At 908, the AAnF checks if it has the UE specific $K_{AKMA}$ key based on the AKMAID. If $K_{AKMA}$ is available in the AAnF, the AAnF proceeds to operation 910, which will be discussed below. If $K_{AKMA}$ is not available, the AAnF sends the AKMA key request to the AUSF by providing AKMAID.

At 909, the AUSF retrieves $K_{AKMA}$ and $K_{AKMA}$ identifier according to AKMAID, and then sends $K_{AKMA}$ and $K_{AKMA}$ identifier to AAnF. The AAnF receives and stores $K_{AKMA}$ and $K_{AKMA}$ identifier with AKMAID.

At 910, the AAnF derives KAF based on $K_{AKMA}$. The AAnF sets the $K_{AF}$ expiration time.

At 911, the AAnF sends the key response information to AF. It includes AAnF ID, $K_{AF}$ and the key expiration time. Here, the AAnF ID is the identity of the AAnF.

At 912, the AF sends an application session establishment response information to the UE. The response information include the KAF key expiration time.

At 913, the UE derives $K_{AF}$ based on $K_{AKMA}$.

Figure 10:
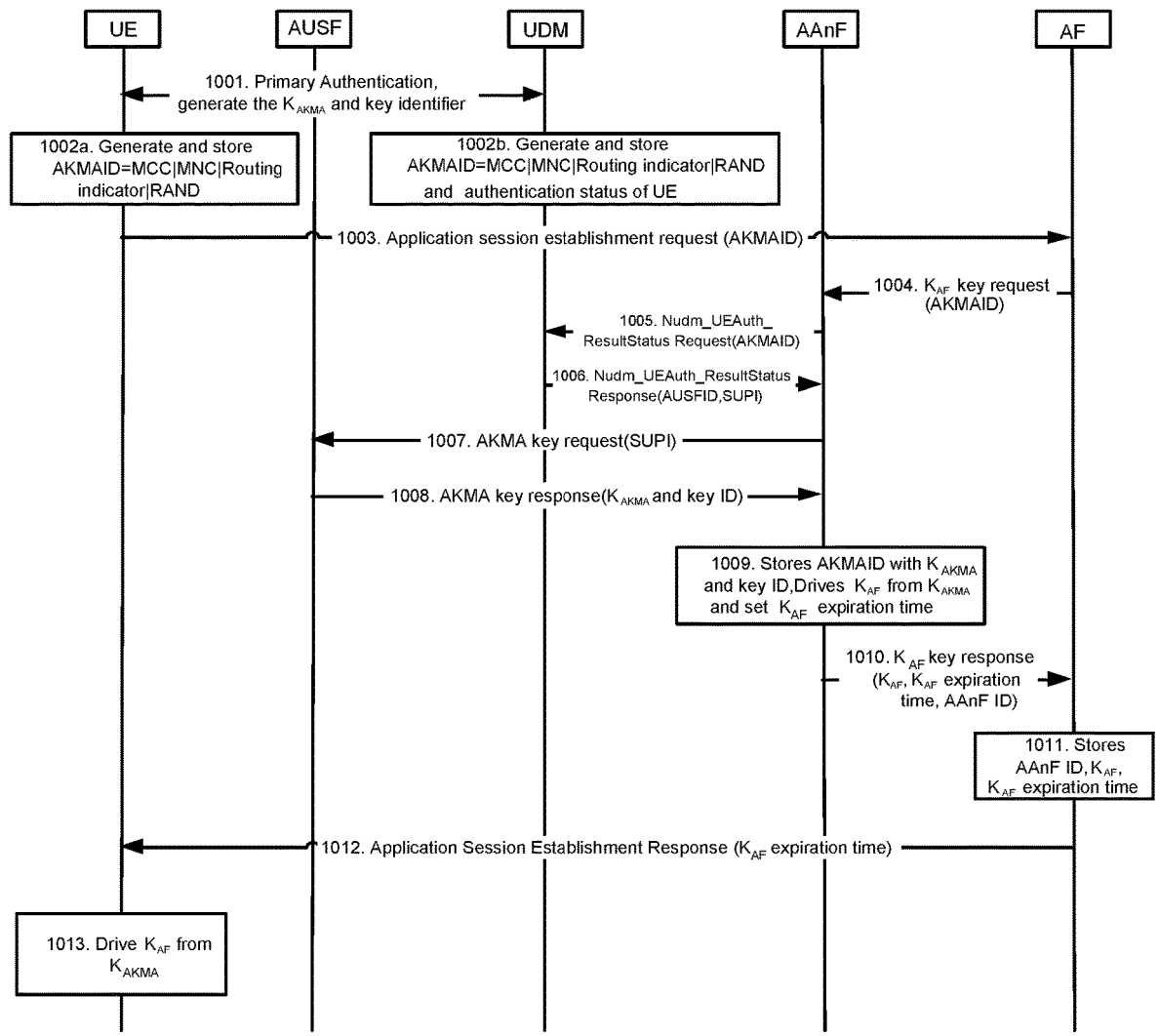
FIG. 10 is a flowchart illustrating yet another example process performed by components of a communication system, based on some embodiments of the disclosed technology.

FIG. 10 is a flowchart illustrating yet another example process performed by components of a communication system, based on some embodiments of the disclosed technology.

In some embodiments of the disclosed technology, a data management function such as a unified data management entity (UDM) may generate an AKMA identifier (AKMAID) for the application session establishment process which can be used to identify AKMA procedures for UE, or which can be used as an identifier to identify the AKMA anchor key. In some implementations, the AKMA identifier (AKMAID) may include, among other things, a combination of MCC, MNC, AUSFID, and RAND or a combination of MCC, MNC, Routing Indicator, and RAND. In some implementations, the AKMA identifier (AKMAID) may include, among other things, a combination of MCC, MNC, AUSFID, and RAND or a combination of MCC, MNC, Routing Indicator, a user equipment (UE) identifier (such as the Generic Public Subscription Identifier (GPSI) or other UE identifier), and RAND. In some implementations, the AKMA identifier (AKMAID) may include, among other things, a mobile country code (MCC), a mobile network code (MNC), a routing indicator, an authentication and key management for applications anchor function (AAnF) identifier, and a random number (RAND). In some implementations, the AKMA identifier (AKMAID) may include, among other things, a mobile country code (MCC), a mobile network code (MNC), a routing indicator, an authentication and key management for applications anchor function (AAnF) identifier, a user equipment (UE) identifier (such as the Generic Public Subscription Identifier (GPSI) or other UE identifier), and a random number (RAND). In some implementations, the AKMA identifier (AKMAID) may include, among other things, a mobile country code (MCC), a mobile network code (MNC), an authentication server function identifier, an authentication and key management for applications anchor function (AAnF) identifier, and a random number (RAND). In some implementations, the AKMA identifier (AKMAID) may include, among other things, a mobile country code (MCC), a mobile network code (MNC), an authentication server function identifier, an authentication and key management for applications anchor function (AAnF) identifier, a user equipment (UE) identifier (such as the Generic Public Subscription Identifier (GPSI) or other UE identifier), and a random number (RAND).

In some embodiments of the disclosed technology, after a successful primary authentication, the unified data management entity (UDM) generates and stores, as AKMAID, a combination of MCC, MNC, AUSFID, and RAND (where MCC identifies uniquely the country, MNC identifies the home PLMN, AUSFID is the identifier of the AUSF, RAND is a random number that the UDM allocated to the UE) or a combination of MCC, MNC, Routing Indicator, and RAND (where MCC identifies uniquely the country, MNC identifies the home PLMN, Routing Indicator is used to route network signaling with AKMAID to AUSF instances, RAND is a random number that the UDM allocated to the UE). In some embodiments of the disclosed technology, after a successful primary authentication, the unified data management entity (UDM) generates and stores, as AKMAID, a combination of MCC, MNC, AUSFID, a user equipment (UE) identifier (such as the Generic Public Subscription Identifier (GPSI) or other UE identifier), and RAND (where MCC identifies uniquely the country, MNC identifies the home PLMN, AUSFID is the identifier of the AUSF, RAND is a random number that the UDM allocated to the UE) or a combination of MCC, MNC, Routing Indicator, a user equipment (UE) identifier (such as the Generic Public Subscription Identifier (GPSI) or other UE identifier), and RAND (where MCC identifies uniquely the country, MNC identifies the home PLMN, Routing Indicator is used to route network signaling with AKMAID to AUSF instances, RAND is a random number that the UDM allocated to the UE).

In some embodiments of the disclosed technology, the UDM is configured to send the AKMAID to an authentication server function entity (AUSF), and the AUSF is configured to store the AKMAID.

The UDM performs the UE parameters update (UPU) procedure and sends the AKMAID as user equipment parameter update (UPU) data to the UE through a UE parameter update procedure. The UE uses the AKMAID in its application session establishment process.

In some embodiments of the disclosed technology, an authentication server function entity (AUSF) may alternatively generate, as AKMAID, a combination of MCC, MNC, AUSFID, and RAND or a combination of MCC, MNC, Routing Indicator, and RAND. In some embodiments of the disclosed technology, an authentication server function entity (AUSF) may alternatively generate, as AKMAID, a combination of MCC, MNC, AUSFID, a user equipment (UE) identifier (such as the Generic Public Subscription Identifier (GPSI) or other UE identifier), and RAND or a combination of MCC, MNC, Routing Indicator, and RAND.

In some embodiments of the disclosed technology, after a successful primary authentication, the AUSF generates and stores, as AKMAID, a combination of MCC, MNC, AUSFID, and RAND (where MCC identifies uniquely the country, MNC identifies the home PLMN, AUSFID is the identifier of the AUSF, RAND is a random number that the UDM allocated to the UE) or a combination of MCC, MNC, Routing Indicator, and RAND (where MCC identifies uniquely the country, MNC identifies the home PLMN, Routing Indicator is used to route network signaling with the AKMAID to AUSF instances, RAND is a random number that the UDM allocated to the UE). In some embodiments of the disclosed technology, after a successful primary authentication, the AUSF generates and stores, as AKMAID, a combination of MCC, MNC, AUSFID, a user equipment (UE) identifier (such as the Generic Public Subscription Identifier (GPSI) or other UE identifier), and RAND (where MCC identifies uniquely the country, MNC identifies the home PLMN, AUSFID is the identifier of the AUSF, RAND is a random number that the UDM allocated to the UE) or a combination of MCC, MNC, Routing Indicator, a user equipment (UE) identifier (such as the Generic Public Subscription Identifier (GPSI) or other UE identifier), and RAND (where MCC identifies uniquely the country, MNC identifies the home PLMN, Routing Indicator is used to route network signaling with the AKMAID to AUSF instances, RAND is a random number that the UDM allocated to the UE).

In some embodiments of the disclosed technology, the AUSF sends the AKMAID to the UDM, and the UDM stores the AKMAID. The UDM performs the UE parameter update (UPU) procedure and sends the AKMAID as UPU data to the UE through UE parameters update procedure. The UE uses the AKMAID in its application session establishment process.

As shown in FIG. 10, an application session establishment based on some embodiments of the disclosed technology may include a plurality of operations 1001-1013.

At 1001, a successful 5G primary authentication results in an authentication server function key ($K_{AUSF}$) being stored at the authentication server function entity (AUSF) and the UE. The UE and the UDM store the RAND which is generated and used in the authentication vector (AV) in a primary authentication. The UE and the AUSF generate the AKMA anchor key ($K_{AKMA}$) and the associated key identifier as part of the UE registration procedure. $K_{AKMA}$ can be derived from $K_{AUSF}$.

At 1002a, the UE generates an AKMAID. The AKMAID is an identifier that will be used by the UE for subsequent requests towards application function entities (AFs). The AKMAID can only be refreshed by running a fresh primary authentication, and thus the AKMAID lifetime(s) cannot be shorter than the time interval between primary authentications. In some implementations, the AKMAID includes a combination of MCC, MNC, Routing Indicator, and RAND, where MCC identifies uniquely the country, MNC identifies the home PLMN, Routing Indicator is used to route network signaling with AKMAID to UDM instances, RAND is generated and used in the authentication vector (AV) in a primary authentication. The UE stores the AKMAID with the $K_{AKMA}$ and $K_{AKMA}$ identifier.

At 1002b, the UDM generates an AKMAID. The AKMAID is an identifier used by the UE for subsequent requests towards AFs. The AKMAID can only be refreshed by running a fresh primary authentication, and thus the AKMAID lifetime(s) cannot be shorter than the time interval between primary authentications. The AKMAID may include a combination of MCC, MNC, Routing Indicator, and RAND, where MCC identifies uniquely the country, MNC identifies the home PLMN, Routing Indicator is used to route network signaling with AKMAID to UDM instances, RAND is generated and used in the authentication vector (AV) in a primary authentication. The UDM stores the AKMAID and an AUSF identifier (AUSFID) with the authentication status of the UE (e.g., SUPI, authentication result, timestamp, and the serving network name).

At 1003, the UE starts communication with the AF with an application session establishment request that includes the AKMAID.

At 1004, the AF sends the key request to the AAnF with the AKMAID received from the UE to request an AF specific key for the UE. The AF also includes its identity (e.g., AF Identifier) in the request.

At 1005, the AAnF checks if it has the UE specific $K_{AKMA}$ key based on the AKMAID. If $K_{AKMA}$ is available in the AAnF, the AAnF proceeds to operation 1009, which will be discussed below. If $K_{AKMA}$ is not available, the AAnF sends a service-based interface request such as Nudm_UE Auth_Result Status Request to the UDM to retrieve the identifier of the latest AUSF that has authenticated the UE and the subscription permanent identifier (SUPI) of the UE. The AAnF provides the AKMAID.

At 1006, the UDM retrieves the information of the identifier of the AUSF instance that has authenticated the UE and the SUPI of the UE based on the AKMAID. The UDM sends a Nudm_UEAuth_ResultStatus Response including the AUSF instance identifier of the last AUSF which has reported a successful primary authentication to the UDM and the UE SUPI.

At 1007, the AAnF sends the key request to the AUSF by providing the UE SUPI.

At 1008, the AUSF retrieves $K_{AKMA}$ and $K_{AKMA}$ identifier according to the SUPI, and then sends $K_{AKMA}$ and $K_{AKMA}$ identifier to AAnF. The AAnF receives and stores $K_{AKMA}$ and $K_{AKMA}$ identifier with AKMAID.

At 1009, the AAnF derives $K_{AF}$ based on $K_{AKMA}$. The AAnF could set the $K_{AF}$ expiration time.

At 1010, the AAnF sends the key response information to AF. It includes AAnF ID, KAF and the key expiration time. Here, the AAnF ID is the identity of the AAnF.

At 1011, the AF receives and stores the AAnF ID, $K_{AF}$ and the key expiration time with AKMAID.

At 1012, the AF sends an application session establishment response information to the UE. The response information includes the $K_{AF}$ key expiration time.

At 1013, the UE derives $K_{AF}$ based on $K_{AKMA}$.

Figure 11:
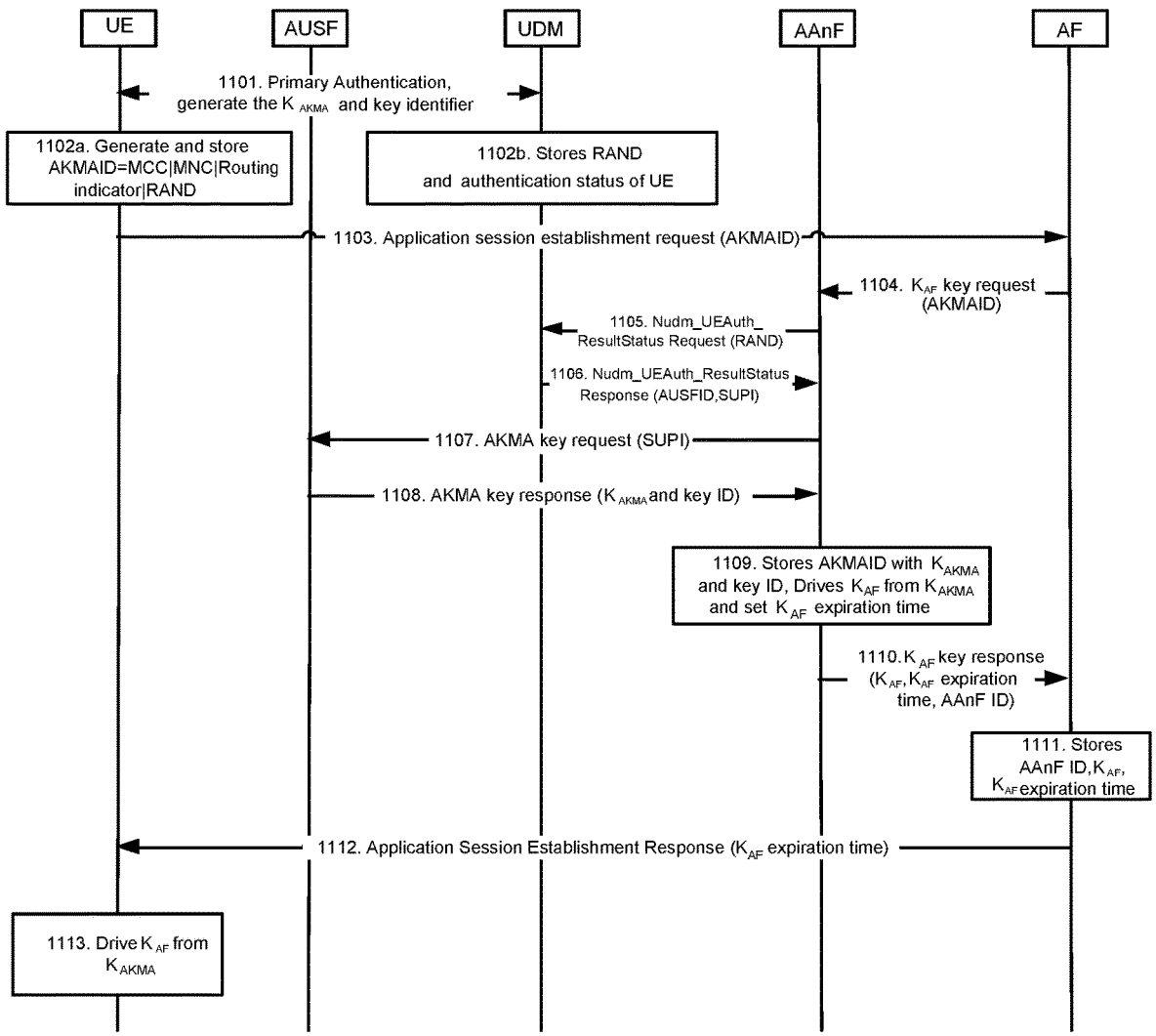
FIG. 11 is a flowchart illustrating yet another example process performed by components of a communication system, based on some embodiments of the disclosed technology.

FIG. 11 is a flowchart illustrating yet another example process performed by components of a communication system, based on some embodiments of the disclosed technology.

As shown in FIG. 11, an application session establishment based on some embodiments of the disclosed technology may include a plurality of operations 1101-1113.

In some embodiments of the disclosed technology, UE may generate an AKMA identifier (AKMAID) for the application session establishment process which can be used to identify AKMA procedures for UE, or which can be used as an identifier to identify the AKMA anchor key. In some implementations, the AKMA identifier (AKMAID) may include, among other things, a combination of MCC, MNC, AUSFID, and RAND or a combination of MCC, MNC, Routing Indicator, and RAND. In some implementations, the AKMA identifier (AKMAID) may include, among other things, a combination of MCC, MNC, AUSFID, a user equipment (UE) identifier (such as the Generic Public Subscription Identifier (GPSI) or other UE identifier), and RAND or a combination of MCC, MNC, Routing Indicator, and RAND. In some implementations, the AKMA identifier (AKMAID) may include, among other things, a mobile country code (MCC), a mobile network code (MNC), a routing indicator, an authentication and key management for applications anchor function (AAnF) identifier, and a random number (RAND). In some implementations, the AKMA identifier (AKMAID) may include, among other things, a mobile country code (MCC), a mobile network code (MNC), a routing indicator, an authentication and key management for applications anchor function (AAnF) identifier, a user equipment (UE) identifier (such as the Generic Public Subscription Identifier (GPSI) or other UE identifier), and a random number (RAND). In some implementations, the AKMA identifier (AKMAID) may include, among other things, a mobile country code (MCC), a mobile network code (MNC), an authentication server function identifier, an authentication and key management for applications anchor function (AAnF) identifier, and a random number (RAND). In some implementations, the AKMA identifier (AKMAID) may include, among other things, a mobile country code (MCC), a mobile network code (MNC), an authentication server function identifier, an authentication and key management for applications anchor function (AAnF) identifier, a user equipment (UE) identifier (such as the Generic Public Subscription Identifier (GPSI) or other UE identifier), and a random number (RAND).

At 1101, a successful 5G primary authentication results in an authentication server function key ($K_{AUSF}$) being stored at the AUSF and the UE. The UE and the UDM will store the RAND which is generated and used in the authentication vector (AV) in a primary authentication. The UE and the AUSF generate the AKMA anchor key ($K_{AKMA}$) and the associated key identifier as part of the UE registration procedure. $K_{AKMA}$ can be derived from $K_{AUSF}$.

At 1102a, the UE generates an AKMAID. The AKMAID is an identifier used by the UE for subsequent requests towards AFs. The AKMAID can only be refreshed by running a fresh primary authentication, and thus the AKMAID lifetime(s) cannot be shorter than the time interval between primary authentications. The AKMAID can include a combination of MCC, MNC, Routing Indicator, a user equipment (UE) identifier (such as the Generic Public Subscription Identifier (GPSI) or other UE identifier), and RAND, where MCC identifies uniquely the country, MNC identifies the home PLMN, Routing Indicator is used to route network signaling with AKMAID to UDM instances, RAND is generated and used in the authentication vector (AV) in a primary authentication. The UE stores the AKMAID with the $K_{AKMA}$ and $K_{AKMA}$ identifier.

In an implementation, after a successful primary authentication, the UE generates and stores, as AKMAID, the combination of MCC, MNC, Routing Indicator, and RAND, where MCC identifies uniquely the country, MNC identifies the home PLMN, Routing Indicator is used to route network signaling with AKMAID to UDM instances, RAND is generated and used in the authentication vector (AV) in a primary authentication.

In another implementation, after a successful primary authentication, the UDM and the UE generate and store, as AKMAID, the combination of MCC, MNC, Routing Indicator, a user equipment (UE) identifier (such as the Generic Public Subscription Identifier (GPSI) or other UE identifier), and RAND, where MCC identifies uniquely the country, MNC identifies the home PLMN, Routing Indicator is used to route network signaling with AKMAID to UDM instances, RAND is generated and used in the authentication vector (AV) in a primary authentication. The UE uses the AKMAID in its application session establishment process.

At 1102b, the UDM stores the RAND and the AUSFID with the authentication status of the UE (e.g., SUPI, authentication result, timestamp, and the serving network name). The RAND is generated and used in the authentication vector (AV) in a primary authentication.

In some implementations, the UDM stores the RAND that is generated and used in the authentication vector (AV) in a primary authentication.

In some implementations, the UE uses AKMAID in its application session establishment process.

At 1103, the UE starts communication with the AF with an application session establishment request. The request includes the AKMAID.

At 1104, the AF sends the key request to the AAnF with the AKMAID received from the UE to request AF specific key for the UE. The AF also includes its identity (AF Identifier) in the request.

At 1105, the AAnF checks if it has the UE specific $K_{AKMA}$ key based on the AKMAID. If the $K_{AKMA}$ is available in the AAnF, the AAnF proceeds to operation 1109, which will be discussed below. If $K_{AKMA}$ is not available, the AAnF gets the RAND from the AKMAID. Then AAnF sends a Nudm_UE Auth_Result Status Request to the UDM to retrieve the identifier of the latest AUSF that has authenticated the UE and the SUPI of the UE. The AAnF provides the RAND.

At 1106, the UDM retrieves the information of the identifier of the AUSF instance that has authenticated the UE and the SUPI of the UE based on the RAND. The UDM sends a Nudm_UEAuth_ResultStatus Response including the AUSF instance identifier of the last AUSF that has reported a successful primary authentication to the UDM and the UE SUPI.

At 1107, the AAnF sends the key request to the AUSF by providing the UE SUPI.

At 1108, the AUSF retrieves $K_{AKMA}$ and $K_{AKMA}$ identifier according to the SUPI, and then sends $K_{AKMA}$ and $K_{AKMA}$ identifier to AAnF. The AAnF receives and stores $K_{AKMA}$ and $K_{AKMA}$ identifier with AKMAID.

At 1109, the AAnF derives $K_{AF}$ based on $K_{AKMA}$. In some implementations, the AAnF sets the $K_{AF}$ expiration time.

At 1110, the AAnF sends the key response information to the AF. It includes AAnF ID, KAF and the key expiration time. AAnF ID is the identity of the AAnF.

At 1111, the AF receives and stores the AAnF ID, $K_{AF}$ and the key expiration time with AKMAID.

At 1112, the AF sends an application session establishment response information to the UE. In some implementations, the response information includes the $K_{AF}$ key expiration time.

At 1113, the UE derives $K_{AF}$ based on $K_{AKMA}$.

Figure 12:
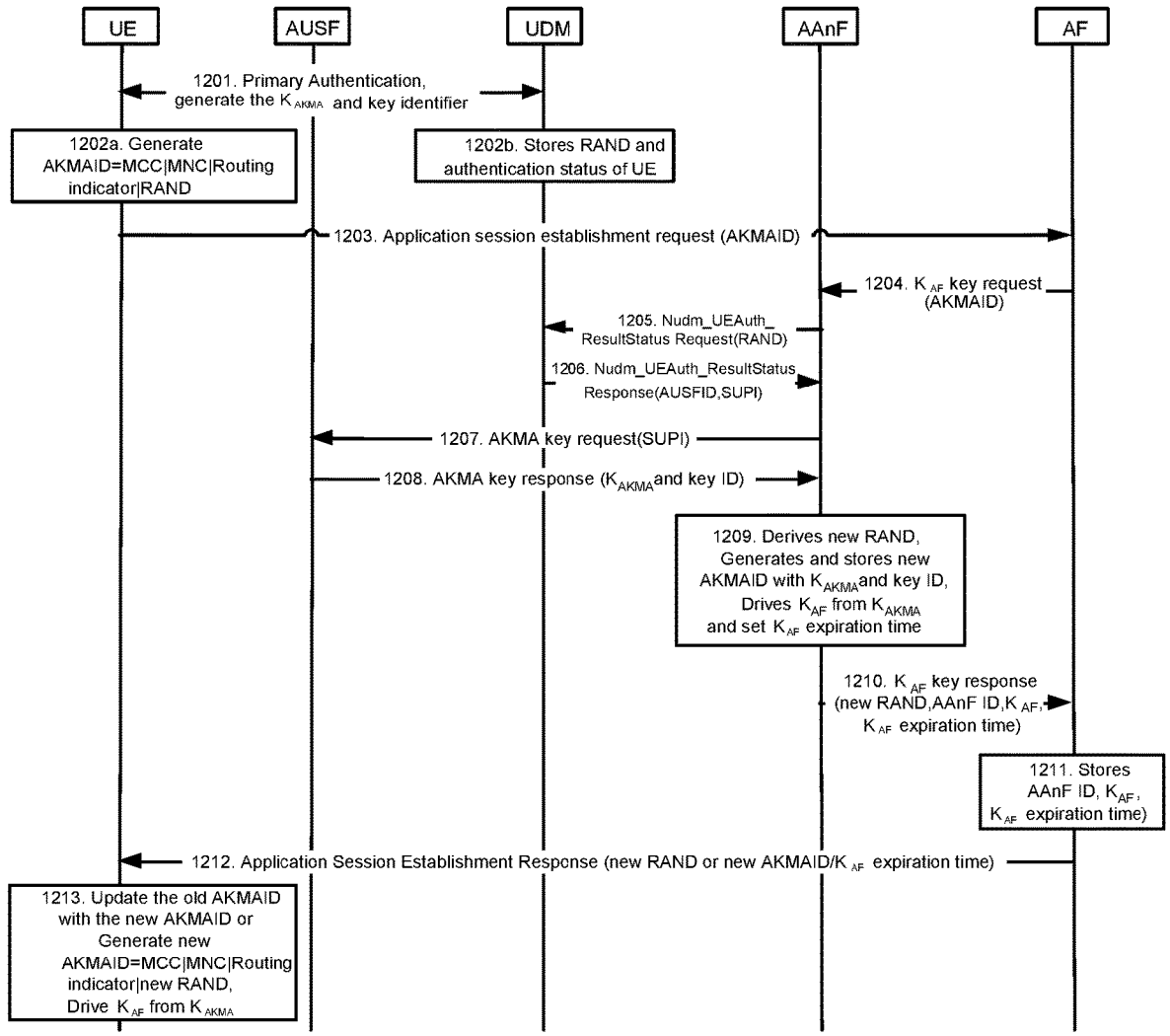
FIG. 12 is a flowchart illustrating yet another example process performed by components of a communication system, based on some embodiments of the disclosed technology.

FIG. 12 is a flowchart illustrating yet another example process performed by components of a communication system, based on some embodiments of the disclosed technology.

In some embodiments of the disclosed technology, the UE generates and stores, as AKMAID which can be used to identify AKMA procedures for UE or which can be used as an identifier to identify the AKMA anchor key, a combination of MCC, MNC, Routing Indicator, and RAND. In some implementations, the AKMA identifier (AKMAID) may include, among other things, a combination of MCC, MNC, AUSFID, and RAND. In some embodiments of the disclosed technology, the UE generates and stores, as AKMAID which can be used to identify AKMA procedures for UE or which can be used as an identifier to identify the AKMA anchor key, a combination of MCC, MNC, Routing Indicator, a user equipment (UE) identifier (such as the Generic Public Subscription Identifier (GPSI) or other UE identifier), and RAND. In some implementations, the AKMA identifier (AKMAID) may include, among other things, a combination of MCC, MNC, AUSFID, a user equipment (UE) identifier (such as the Generic Public Subscription Identifier (GPSI) or other UE identifier), and RAND. In some implementations, the AKMA identifier (AKMAID) may include, among other things, a mobile country code (MCC), a mobile network code (MNC), a routing indicator, an authentication and key management for applications anchor function (AAnF) identifier, and a random number (RAND). In some implementations, the AKMA identifier (AKMAID) may include, among other things, a mobile country code (MCC), a mobile network code (MNC), an authentication server function identifier, an authentication and key management for applications anchor function (AAnF) identifier, and a random number (RAND). In some implementations, the AKMA identifier (AKMAID) may include, among other things, a mobile country code (MCC), a mobile network code (MNC), a routing indicator, an authentication and key management for applications anchor function (AAnF) identifier, a user equipment (UE) identifier (such as the Generic Public Subscription Identifier (GPSI) or other UE identifier), and a random number (RAND). In some implementations, the AKMA identifier (AKMAID) may include, among other things, a mobile country code (MCC), a mobile network code (MNC), an authentication server function identifier, an authentication and key management for applications anchor function (AAnF) identifier, a user equipment (UE) identifier (such as the Generic Public Subscription Identifier (GPSI) or other UE identifier), and a random number (RAND).

After a successful primary authentication, the UE generates and stores, as AKMAID, a combination of MCC, MNC, Routing Indicator, a user equipment (UE) identifier (such as the Generic Public Subscription Identifier (GPSI) or other UE identifier), and RAND, where MCC identifies uniquely the country, MNC identifies the home PLMN, Routing Indicator is used to route network signaling with AKMAID to UDM instances, RAND is generated and used in the authentication vector (AV) in a primary authentication.

After a successful primary authentication, the UDM stores the RAND that is generated and used in the authentication vector (AV) in a primary authentication. The UE uses AKMAID its application session establishment process.

In some implementations, the AAnF generates a new RAND and a new AKMAID.

In some implementations, the UE generates a new RAND and a new AKMAID. In some implementations, the UE can update the old AKMAID with the received new AKMAID.

At 1201, a successful 5G primary authentication results in a $K_{AUSF}$ being stored at the AUSF and the UE. The UE and the UDM will store the RAND that is generated and used in the authentication vector (AV) in a primary authentication. The UE and the AUSF generate the AKMA anchor key ($K_{AKMA}$) and the associated key identifier as part of the UE Registration procedure. The $K_{AKMA}$ can be derived from $K_{AUSF}$.

At 1202a, the UE generates an AKMAID. Here, the AKMAID is an identifier used by the UE for subsequent requests towards AFs. The AKMAID can include a combination of MCC, MNC, Routing Indicator, and RAND, where MCC identifies uniquely the country, MNC identifies the home PLMN, Routing Indicator is used to route network signaling with AKMAID to UDM instances, RAND is generated and used in the authentication vector (AV) in a primary authentication. The UE stores the AKMAID with the $K_{AKMA}$ and $K_{AKMA}$ identifier.

At 1202b, the UDM stores the RAND and AUSFID with the authentication status of the UE (e.g., SUPI, authentication result, timestamp, and the serving network name). The RAND is generated and used in the authentication vector (AV) in a primary authentication.

At 1203, the UE starts communication with the AF with an application session establishment request. The request includes AKMAID.

At 1204, the AF sends the key request to the AAnF with the AKMAID received from the UE to request an AF specific key for the UE. The AF also includes its identity (AF Identifier) in the request.

At 1205, the AAnF checks if it has the UE specific $K_{AKMA}$ key based on the AKMAID. If the $K_{AKMA}$ is available in the AAnF, the AAnF proceeds to operation 1209, which will be discussed below. If $K_{AKMA}$ is not available, the AAnF gets the RAND from the AKMAID. Then AAnF sends a Nudm_UE Auth_Result Status Request to the UDM to retrieve the identifier of the latest AUSF that has authenticated the UE and the SUPI of the UE. The AAnF provides the RAND.

At 1206, the UDM retrieves the information of the identifier of the AUSF instance that authenticated the UE and the SUPI of the UE based on the RAND. The UDM sends a Nudm_UE Auth_Result Status Response including the AUSF instance identifier of the last AUSF that has reported a successful primary authentication to the UDM and the UE SUPI.

At 1207, the AAnF sends the key request to the AUSF by providing the UE SUPI.

At 1208, the AUSF retrieves $K_{AKMA}$ and $K_{AKMA}$ identifier according to the SUPI, and then sends the $K_{AKMA}$ and $K_{AKMA}$ identifier to AAnF. The AAnF receives and stores $K_{AKMA}$ and $K_{AKMA}$ identifier with AKMAID.

At 1209, the AAnF generates a new RAND and a new AKMAID based on the new RAND. In some implementations, the new AKMAID may include a combination of MCC, MNC, Routing Indicator, and the new RAND, where MCC, MNC and Routing Indicator are same as the corresponding parts of the old AKMAID. That means that the new AKMAID can be obtained only by using the new RAND to update the old RAND in the old AKMAID. The AAnF stores $K_{AKMA}$ and $K_{AKMA}$ identifier with the new AKMAID, and deletes the old AKMAID. The AAnF derives $K_{AF}$ based on $K_{AKMA}$. The AAnF sets the $K_{AF}$ expiration time. The AAnF can also derives $K_{AF}$ based on $K_{AKMA}$ and the new RAND which is generated by the AAnF.

At 1210, the AAnF sends the key response information to the AF. The key response information includes AAnF ID, new RAND or new AKMAID, $K_{AF}$ and the key expiration time. Here, the AAnF ID is the identity of the AAnF.

At 1211, the AF receives and stores the AAnF ID, $K_{AF}$ and the key expiration time with AKMAID.

At 1212, the AF sends an application session establishment response information to the UE. The response information includes a new RAND or a new AKMAID and the $K_{AF}$ key expiration time.

At 1213, the UE updates the old AKMID with the received new AKMAID, or the UE generates a new AKMAID based on the received new RAND. In some implementations, the new AKMAID includes a combination of MCC, MNC, Routing Indicator, and the new RAND, where MCC, MNC and Routing Indicator are the same as the corresponding parts of the old AKMAID, and thus the new AKMAID can be obtained only by using the new RAND to update the old RAND in the old AKMAID. The UE stores $K_{AKMA}$ and $K_{AKMA}$ identifier with the new AKMAID, and deletes the old AKMAID. The UE derives $K_{AF}$ based on $K_{AKMA}$. The UE can also derive the $K_{AF}$ based on $K_{AKMA}$ and the received new RAND generated by the AAnF.

Figure 13:
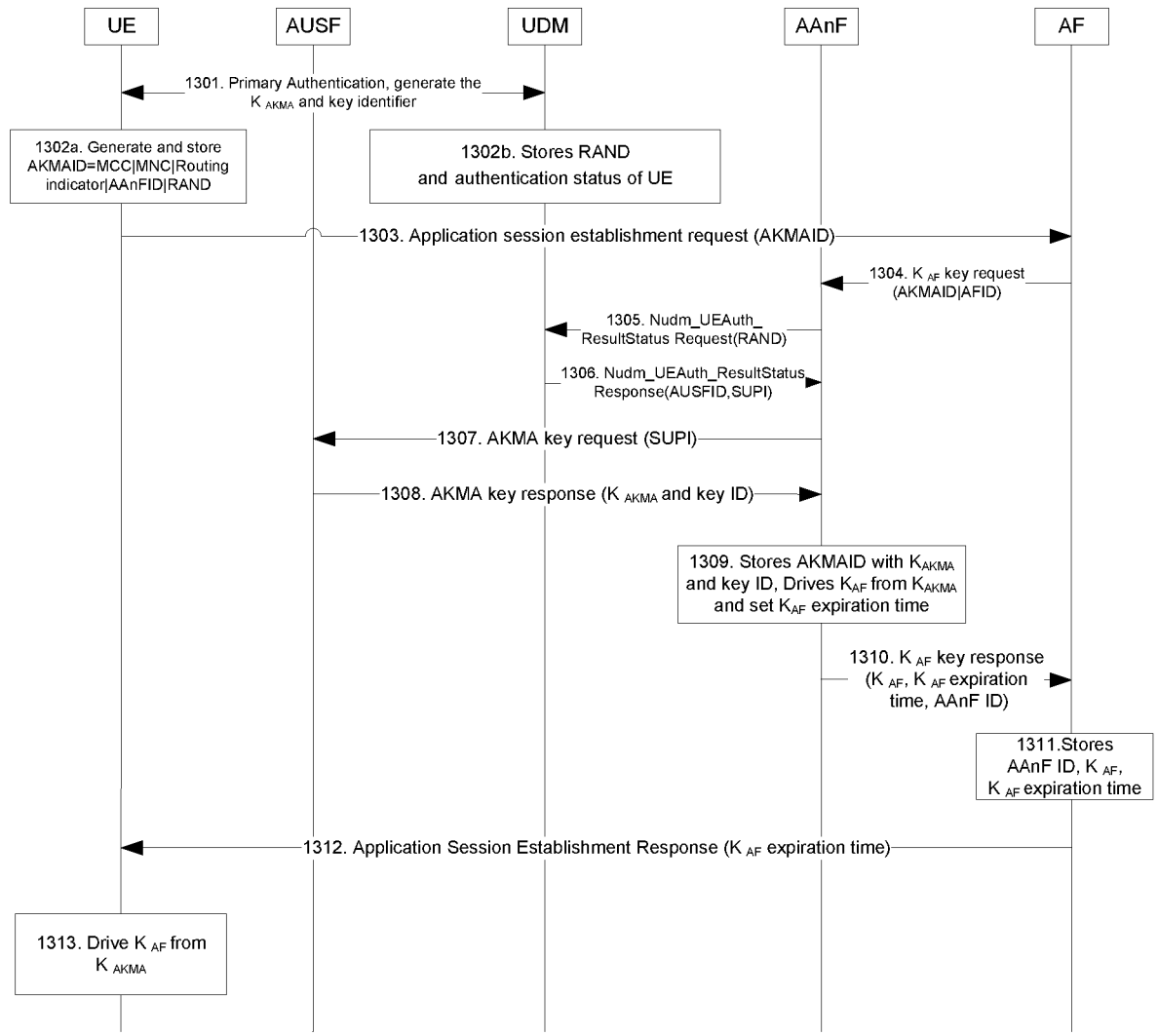
FIG. 13 is a flowchart illustrating yet another example process performed by components of a communication system, based on some embodiments of the disclosed technology.

FIG. 13 is a flowchart illustrating yet another example process performed by components of a communication system, based on some embodiments of the disclosed technology.

At 1301, a successful 5G primary authentication results in $K_{AUSF}$ being stored at the AUSF and the UE. The UE and the UDM store the RAND generated and used in the authentication vector (AV) in a primary authentication. The UE and the AUSF generates the AKMA Anchor Key ($K_{AKMA}$) and the associated key identifier as part of the UE registration procedure. The $K_{AKMA}$ can be derived from $K_{AUSF}$.

At 1302a, the UE generates an AKMAID. The AKMAID is an identifier used by the UE for subsequent requests towards the AFs. The AKMAID can only be refreshed by running a fresh primary authentication. This means that the AKMAID lifetime(s) cannot be shorter than the time interval between primary authentications. In some implementations, the AKMAID include a combination of MCC, MNC, routing indicator, AAnFID, and RAND, where the MCC identifies uniquely the country, the MNC identifies the home PLMN, the routing indicator is used to route network signaling with the AKMAID to UDM instances, the AAnFID is the identifier used to identify an AAnF entity, the RAND is generated and used in the authentication vector (AV) in a primary authentication. The UE stores the AKMAID with the $K_{AKMA}$ and $K_{AKMA}$ identifier.

At 1302b, the UDM stores the RAND and AUSFID with the authentication status of the UE (e.g., SUPI, authentication result, timestamp, and the serving network name). The RAND is generated and used in the authentication vector (AV) in a primary authentication.

At 1303, the UE starts communication with the AF with an application session establishment request. The request includes AKMAID.

At 1304, the AF sends the key request to the AAnF with the AKMAID received from the UE to request an AF specific key for the UE. The AF also includes its identity (AF identifier) in the request.

At 1305, the AAnF checks if it has the UE specific $K_{AKMA}$ key by the AKMAID. If $K_{AKMA}$ is available in the AAnF, the AAnF proceeds to operation 1309 which will be discussed below. If $K_{AKMA}$ is not available, the AAnF gets the RAND from the AKMAID. Then AAnF sends a Nudm_UE Auth_Result Status Request to the UDM to retrieve the identifier of the latest AUSF that has authenticated the UE and the SUPI of the UE. The AAnF provides the RAND.

At 1306, the UDM retrieves the information of the identifier of the AUSF instance that authenticated the UE and SUPI of the UE based on the RAND. The UDM sends a Nudm_UE Auth_Result Status Response including the AUSF instance identifier of the last AUSF which reported a successful primary authentication to the UDM and the UE SUPI.

At 1307, the AAnF sends the key request to AUSF by providing the UE SUPI.

At 1308, the AUSF retrieves $K_{AKMA}$ and $K_{AKMA}$ identifier according to SUPI, and then sends $K_{AKMA}$ and $K_{AKMA}$ identifier to AAnF. AAnF receives and stores KAKMA and $K_{AKMA}$ identifier with AKMAID.

At 1309, the AAnF derives $K_{AF}$ based on $K_{AKMA}$. The AAnF may set the $K_{AF}$ expiration time.

At 1310, the AAnF sends the key response information to the AF. It includes an AAnF ID, $K_{AF}$ and the key expiration time. The AAnF ID is the identity of the AAnF.

At 1311, the AF receives and stores the AAnF ID, $K_{AF}$ and the key expiration time with AKMAID.

At 1312, the AF sends an application session establishment response information to the UE. The response information may include the $K_{AF}$ key expiration time.

At 1313, the UE derives $K_{AF}$ based on $K_{AKMA}$.

Figure 14:
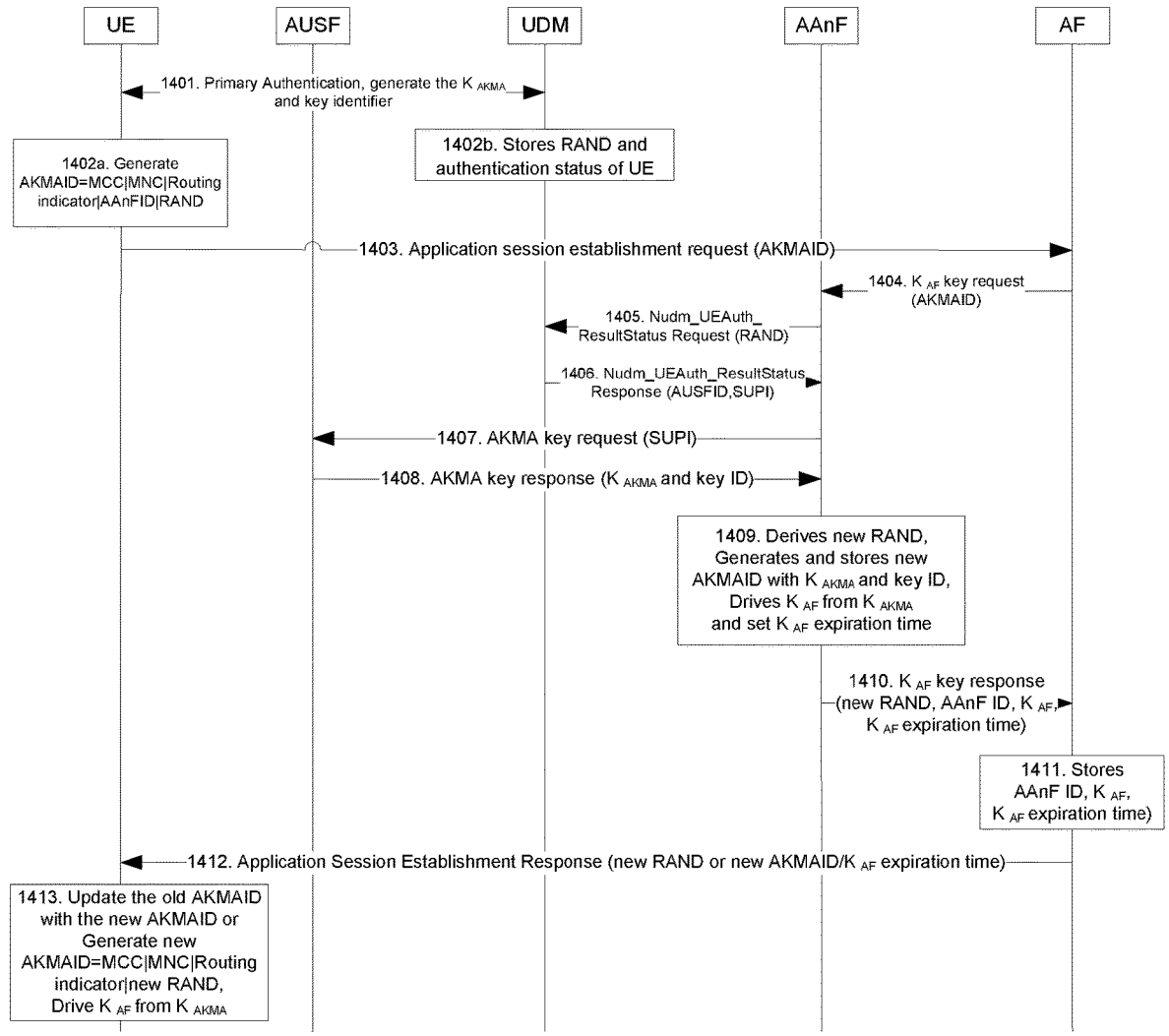
FIG. 14 is a flowchart illustrating yet another example process performed by components of a communication system, based on some embodiments of the disclosed technology.

FIG. 14 is a flowchart illustrating yet another example process performed by components of a communication system, based on some embodiments of the disclosed technology.

At 1401, a successful 5G primary authentication results in $K_{AUSF}$ being stored at the AUSF and the UE. The UE and the UDM stores the RAND generated and used in the authentication vector (AV) in a primary authentication. The UE and the AUSF generate the AKMA Anchor Key ($K_{AKMA}$) as part of the UE registration procedure. $K_{AKMA}$ can be derived from $K_{AUSF}$. In some implementations, a successful 5G primary authentication results in $K_{AUSF}$ being stored at the AUSF and the UE. The UE generates and stores the RAND generated by base64encode. The UE and the AUSF generate the AKMA Anchor Key ($K_{AKMA}$) as part of the UE registration procedure. $K_{AKMA}$ can be derived from $K_{AUSF}$.

At 1402a, the UE generates an AKMAID. The AKMAID is an identifier used by the UE for subsequent requests towards AFs. The AKMAID may include a combination of MCC, MNC, routing indicator, AAnFID, a user equipment (UE) identifier (such as the Generic Public Subscription Identifier (GPSI) or other UE identifier), and RAND, where the MCC identifies uniquely the country, the MNC identifies the home PLMN, the routing indicator is used to route network signaling with the AKMAID to UDM instances, the AAnFID is the identifier used to identify an AAnF entity, the RAND is generated and used in the authentication vector (AV) in a primary authentication. The UE stores the AKMAID with the $K_{AKMA}$ and $K_{AKMA}$ identifier. In some implementations, the AKMAID may also include a combination of MCC, MNC, routing indicator, AAnFID, a user equipment (UE) identifier (such as the Generic Public Subscription Identifier (GPSI) or other UE identifier), and RAND, where the MCC identifies uniquely the country, the MNC identifies the home PLMN, the routing indicator is used to route network signaling with the AKMAID to UDM instances, the AAnFID is the identifier used to identify an AAnF entity, the RAND is generated by base64encode. The UE stores the AKMAID with the $K_{AKMA}$ and $K_{AKMA}$ identifier. In some implementations, the AKMAID may also include a combination of AAnFID, a user equipment (UE) identifier (such as the Generic Public Subscription Identifier (GPSI) or other UE identifier), and RAND, where the AAnFID is the identifier used to identify an AAnF entity (such as AAnF domain name), the RAND is generated by base64encode. The UE stores the AKMAID with the $K_{AKMA}$ and $K_{AKMA}$ identifier.

At 1402b, the UDM stores the RAND and AUSFID with the authentication status of the UE (e.g., SUPI, authentication result, timestamp, and the serving network name). RAND is generated and used in the authentication vector (AV) in a primary authentication.

At 1403, the UE starts communication with the AF with an application session establishment request. The request includes AKMAID.

At 1404, the AF sends the key request to the AAnF with the AKMAID received from the UE to request an AF specific key for the UE. The AF also includes its identity (e.g., AF identifier) in the request. AF can select the AAnF based on the AKMAID.

At 1405, the AAnF checks if it has the UE specific $K_{AKMA}$ key by the AKMAID. If $K_{AKMA}$ is available in the AAnF, the AAnF proceeds to operation 1409 which will be discussed below. If $K_{AKMA}$ is not available, the AAnF gets the RAND and/or UE identifier from the AKMAID. Then AAnF sends a Nudm_UE Auth_Result Status Request to the UDM to retrieve the identifier of the latest AUSF that authenticated the UE and the SUPI of the UE. The AAnF provides the RAND and/or UE identifier. In some implementations, the AAnF checks if it has the UE specific $K_{AKMA}$ key by the AKMAID. If $K_{AKMA}$ is available in the AAnF, the AAnF proceeds to operation 1409 which will be discussed below. If $K_{AKMA}$ is not available, then AAnF sends a Nudm_UE Auth_Result Status Request to the UDM to retrieve the identifier of the latest AUSF that authenticated the UE and the SUPI of the UE. The AAnF provides the AKMAID.

At 1406, the UDM retrieves the information of the identifier of the AUSF instance that authenticated the UE and SUPI of the UE based on the RAND and/or UE identifier. The UDM sends a Nudm_UEAuth_ResultStatus Response including the AUSF instance identifier of the last AUSF which reported a successful primary authentication to the UDM and the UE SUPI. In some implementations, the UDM retrieves the information of the identifier of the AUSF instance that authenticated the UE and SUPI of the UE based on AKMAID. The UDM sends a Nudm_UEAuth_ResultStatus Response including the AUSF instance identifier of the last AUSF which reported a successful primary authentication to the UDM and the UE SUPI.

At 1407, the AAnF sends the key request to AUSF by providing the UE SUPI.

At 1408, the AUSF retrieves $K_{AKMA}$ and $K_{AKMA}$ identifier according to the SUPI, and then sends $K_{AKMA}$ and $K_{AKMA}$ identifier to AAnF. AAnF receives and stores $K_{AKMA}$ and $K_{AKMA}$ identifier with AKMAID.

At 1409, the AAnF generates a new RAND by base64encode (RAND), and generates a new AKMAID based on the new RAND, the new AKMAID may include a combination of MCC, MNC, routing indicator, AAnFID, user equipment (UE) identifier (such as the Generic Public Subscription Identifier (GPSI) or other UE identifier), and the new RAND, where MCC, MNC, routing indicator and AAnFID are the same as the corresponding parts of the old AKMAID. The AAnF stores $K_{AKMA}$ and $K_{AKMA}$ identifier with the new AKMAID, and deletes the old AKMAID. The AAnF derives $K_{AF}$ based on $K_{AKMA}$. The AAnF may set the $K_{AF}$ expiration time. The AAnF can also derive $K_{AF}$ based on $K_{AKMA}$ and the new RAND which is generated by the AAnF.

At 1410, the AAnF sends the key response information to the AF. It may include AAnF ID, a new RAND or a new AKMAID, $K_{AF}$ and the key expiration time. AAnFID is the identity of the AAnF, AAnFID can be a domain name, i.e., AAnF_server_domain_name.

At 1411, the AF receives and stores the AAnF ID, $K_{AF}$ and the key expiration time with AKMAID.

At 1412, the AF sends an application session establishment response information to the UE. The response information may include the new RAND or the new AKMAID and the $K_{AF}$ key expiration time. In some implementations, the AF sends an application session establishment response information to the UE. The response information may include the new RAND or the new AKMAID (AKMAID=base64encode(RAND)@AAnF_server_domain_name) and the $K_{AF}$ key expiration time.

At 1413, the UE updates the old AKMID with the received new AKMAID. In another implementation, the UE generates a new AKMAID based on the received new RAND, and the new AKMAID include a combination of MCC, MNC, routing indicator, AAnFID, user equipment (UE) identifier, and the new RAND, where MCC, MNC, routing indicator and AAnFID are the same as the corresponding parts of the old AKMAID. The UE stores $K_{AKMA}$ and $K_{AKMA}$ identifier with the new AKMAID, and may delete the old AKMAID. The UE derives $K_{AF}$ based on $K_{AKMA}$. The UE can also derive $K_{AF}$ based on $K_{AKMA}$ and the received new RAND which is generated by the AAnF.

Figure 15:
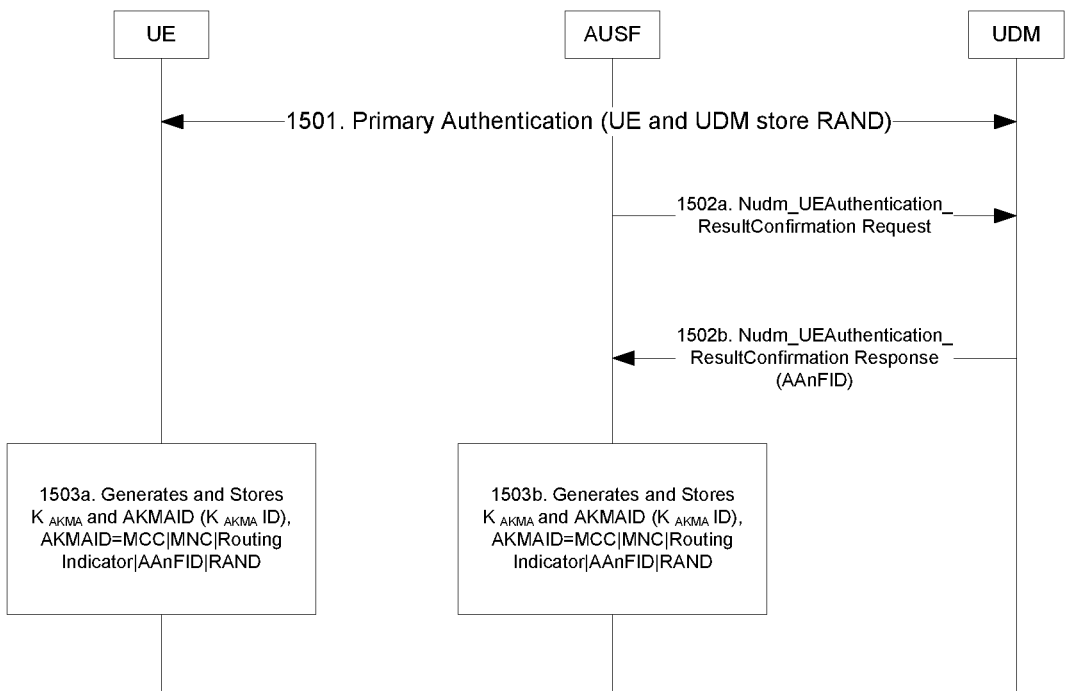
FIG. 15 is a flowchart illustrating yet another example process performed by components of a communication system, based on some embodiments of the disclosed technology.

FIG. 15 is a flowchart illustrating yet another example process performed by components of a communication system, based on some embodiments of the disclosed technology.

At 1501, a successful 5G primary authentication results in $K_{AUSF}$ being stored at the AUSF and the UE. The UE stores the RAND generated and used in the authentication vector (AV) in a primary authentication. The UDM may store the RAND generated and used in the authentication vector (AV) in a primary authentication.

At 1502a, the AUSF informs the UDM about the result and time of an authentication procedure with a UE using a Nudm_UE Authentication_Result Confirmation Request. This includes the SUPI, a timestamp of the authentication, the authentication type (e.g. EAP method or 5G-AKA), and the serving network name.

At 1502b, the UDM replies a Nudm_UEAuthentication_ResultConfirmation Response including AAnFID to the AUSF. The AAnFID can be stored in the UDM as part of subscription of the UE.

At 1503a, the UE generates $K_{AKMA}$ and key identifier AKMAID for the UE. The AKMAID is an identifier used by the UE for subsequent requests towards the AFs. The AKMAID include a combination of MCC, MNC, routing indicator, AAnFID, and RAND, where the MCC identifies uniquely the country, the MNC identifies the home PLMN, the routing indicator is used to route network signaling with the AKMAID to UDM instances, the AAnFID is the identifier used to identify an AAnF entity, the RAND is generated and used in the authentication vector (AV) in a primary authentication. The UE stores the AKMAID with the $K_{AKMA}$. The AAnFID can be stored in USIM as part of subscription of UE.

At 1503b, the AUSF generates $K_{AKMA}$ and key identifier AKMAID for the UE. The AKMAID is an identifier used by the UE for subsequent requests towards the AFs. The AKMAID may include a combination of MCC, MNC, routing indicator, AAnFID, and RAND, where MCC identifies uniquely the country, MNC identifies the home PLMN, the routing indicator is used to route network signaling with the AKMAID to UDM instances, the AAnFID is the identifier used to identify an AAnF entity, the RAND is generated and used in the authentication vector (AV) in a primary authentication. The AUSF stores the AKMAID with the $K_{AKMA}$.

Figure 16:
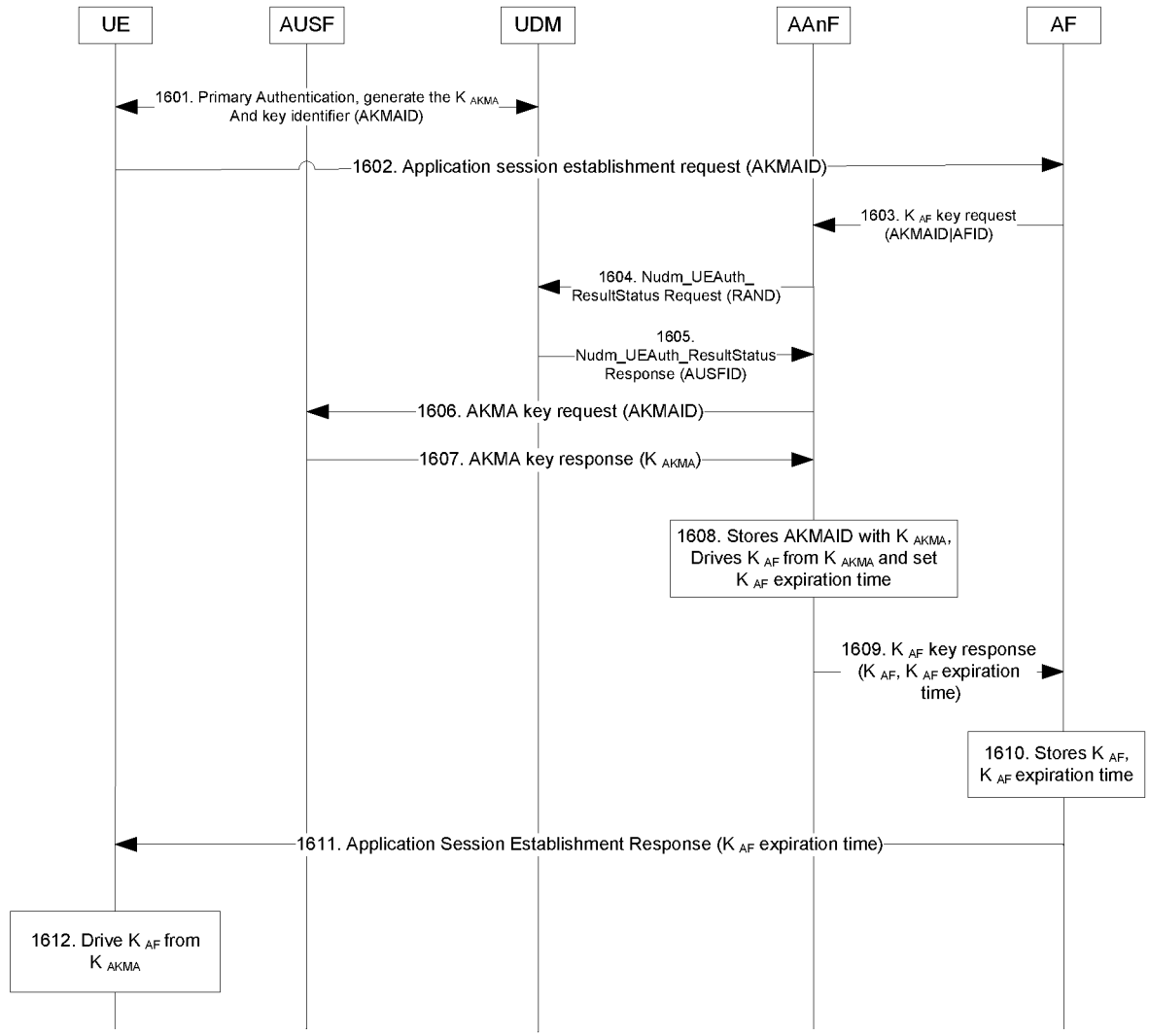
FIG. 16 is a flowchart illustrating yet another example process performed by components of a communication system, based on some embodiments of the disclosed technology.

FIG. 16 is a flowchart illustrating yet another example process performed by components of a communication system, based on some embodiments of the disclosed technology.

At 1601, a successful 5G primary authentication results in $K_{AUSF}$ being stored at the AUSF and the UE. The UE and the UDM store the RAND generated and used in the authentication vector (AV) in a primary authentication. The UE and the AUSF generate and store the AKMA Anchor Key ($K_{AKMA}$) and the associated key identifier AKMAID as part of the UE Registration procedure. The $K_{AKMA}$ can be derived from the $K_{AUSF}$. The AKMAID is an identifier used by UE for subsequent requests towards AFs. The AKMAID can only be refreshed by running a fresh primary authentication. This means that the AKMAID lifetime(s) cannot be shorter than the time interval between primary authentications. The AKMAID may include a combination of MCC, MNC, routing indicator, AAnFID, and RAND, where the MCC identifies uniquely the country, the MNC identifies the home PLMN, the routing indicator is used to route network signaling with the AKMAID to UDM instances, the AAnFID is the identifier used to identify an AAnF entity, and RAND is generated and used in the authentication vector (AV) in a primary authentication.

At 1602, the UE starts communication with the AF with an application session establishment request. The request includes AKMAID.

At 1603, the AF sends the key request to the AAnF with the AKMAID received from the UE to request AF specific key for the UE. The AF also includes its identity (AF Identifier) in the request.

At 1604, the AAnF checks if it has the UE specific $K_{AKMA}$ key by the AKMAID. If $K_{AKMA}$ is available in the AAnF, the AAnF proceeds to Step 1608. If KAKMA is not available, the AAnF gets the RAND from the AKMAID. Then AAnF sends a Nudm_UEAuth_ResultStatus Request to the UDM to retrieve the identifier of the latest AUSF that authenticated the UE and the SUPI of the UE. The AAnF provides the RAND.

At 1605, the UDM retrieves the information of the identifier of the AUSF instance that authenticated the UE based on the RAND. The UDM sends a Nudm_UEAuth_ResultStatus Response including the AUSF instance identifier of the last AUSF which reported a successful primary authentication to the UDM.

At 1606, the AAnF sends the Key request to AUSF by providing the AKMAID.

At 1607, the AUSF retrieves $K_{AKMA}$ and $K_{AKMA}$ identifier according to AKMAID, and then sends $K_{AKMA}$ to AAnF. The AAnF receives and stores $K_{AKMA}$ and AKMAID.

At 1608, the AAnF derives $K_{AF}$ based on $K_{AKMA}$. The AAnF could set the $K_{AF}$ expiration time.

At 1609, the AAnF sends the key response information to AF. It includes $K_{AF}$ and the key expiration time.

At 1610, the AF receives and stores $K_{AF}$ and the key expiration time with AKMAID.

At 1611, the AF sends an Application session establishment response information to UE. The response information could include the $K_{AF}$ key expiration time.

At 1612 the UE derives $K_{AF}$ based on $K_{AKMA}$.

Figure 17:
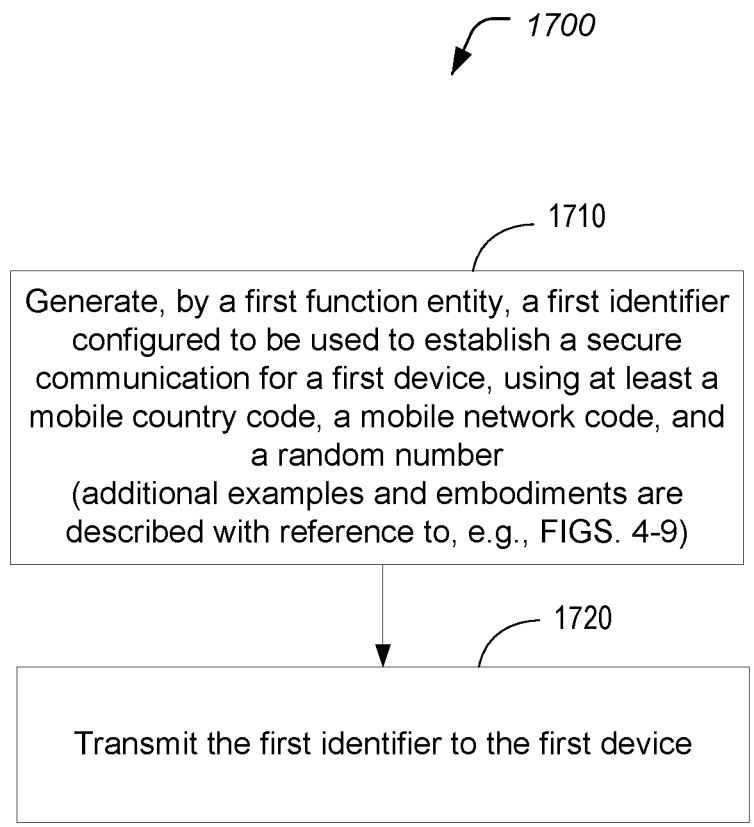
FIG. 17 is a flow diagram illustrating an example of a wireless communication method based on some embodiments of the disclosed technology.

FIG. 17 is a flow diagram illustrating an example of a wireless communication method based on some embodiments of the disclosed technology. The wireless communication method 1700 includes, at 1710, generating, by a first function entity, a first identifier configured to be used to establish a secure communication for a first device, using at least a mobile country code, a mobile network code, and a random number, and at 1720, transmitting the first identifier to the first device. In some implementations, the first device includes a user equipment (UE). In some implementations, the first identifier is further based on at least one of a routing indicator (e.g., Routing Indicator) or an authentication server function identifier. In some embodiments of the disclosed technology, the first identifier includes the AKMAID discussed above. In some implementations, the mobile country code (e.g., MCC) is used to identify a country where the first function entity is performed, the mobile network code (e.g., MNC) is used to identify a home public land mobile network, the random number (e.g., RAND) is allocated by the first function entity to be used for the first device, the routing indicator is used to route network signaling with the authentication and key management, and the authentication server function identifier (e.g., AUSFID) is used to identify an authentication server function entity (e.g., AUSF). In some implementations, the first identifier is generated according to an architecture for authentication and key management for applications (e.g., AKMA).

In a mobile network service intended to support authentication and key management, a set of function entities can be deployed in the mobile network. Such function entities include a network exposure function entity (NEF), an AKMA anchor function entity (AAnF), a unified data management entity (UDE), an authentication server function entity (AUSF), an access and mobility management function entity (AMF), and an application function entity (AF). Function entities interact with each other using service-based interfaces.

In some implementations, the transmitting of the first identifier to the first device is carried out by performing, by a unified data management entity (e.g., UDE), a parameter update procedure for the first device. In some implementations, the first function entity stores the first identifier. In some implementations, the first device stores the first identifier.

In some implementations, the wireless communication method 1700 further includes sending, by the first function entity, the first identifier to a second function entity. In some implementations, the second function entity is configured to store the first identifier.

In some implementations, the second function entity is the authentication server function entity (e.g., AUSF).

In some implementations, the first function entity includes an authentication server function entity (e.g., AUSF) in communication with at least one of a network exposure function entity (e.g., NEF), an authentication and key management for applications anchor function entity (e.g., AAnF), a unified data management entity (e.g., UDE), an access and mobility management function entity (e.g., AMF), or an application function entity (e.g., AF). In some implementations, the second function entity includes the unified data management entity (e.g., UDE).

In some implementations, the first identifier is generated upon completion of a primary authentication. In some implementations, the first device is configured to use the first identifier to establish a secure communication with an application function (e.g., AF).

In some implementations, the first identifier is further based on an authentication and key management for applications anchor function (AAnF) identifier. In some implementations, the first identifier is used to identify authentication and key management for applications (AKMA) procedures for the first device such as the UE. In some implementations, the first identifier is used as an identifier to identify an authentication and key management for applications (AKMA) anchor key.

Figure 18:
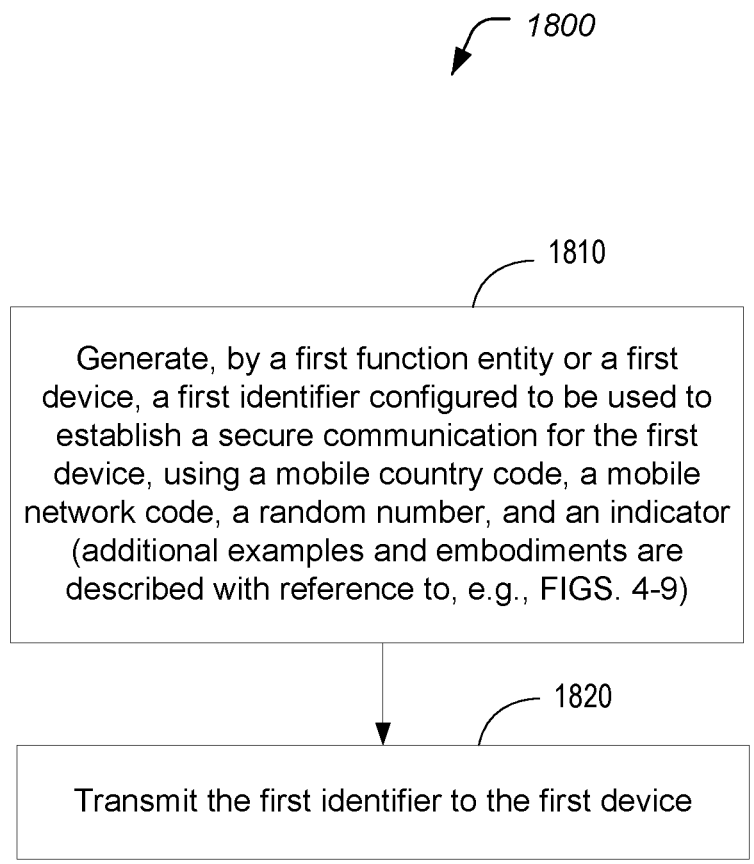
FIG. 18 is a flow diagram illustrating another example of a wireless communication method based on some embodiments of the disclosed technology.

FIG. 18 is a flow diagram illustrating another example of a wireless communication method based on some embodiments of the disclosed technology. The wireless communication method 1800 includes, at 1810, generating, by a first function entity or a first device, a first identifier configured to be used to establish a secure communication for the first device, using a mobile country code, a mobile network code, a random number, and an indicator, and at 1820, transmitting the first identifier to the first device.

In some embodiments of the disclosed technology, the first identifier includes the AKMAID discussed above. In some implementations, the indicator includes a routing indicator. In some implementations, the mobile country code (e.g., MCC) is used to identify a country where the first function entity is performed, the mobile network code (e.g., MNC) is used to identify a home public land mobile network, the random number (e.g., RAND) is allocated by the first function entity to be used for authentication, the routing indicator (e.g., Routing Indicator) is used to route network signaling with the authentication and key management. In some implementations, the first identifier is generated according to an architecture for authentication and key management for applications (AKMA).

In some implementations, the first function entity stores the first identifier. In some implementations, the first device stores the first identifier. In some implementations, the first function entity includes a unified data management entity (e.g., UDM) in communication with at least one of a network exposure function entity (e.g., NEF), an authentication and key management for applications anchor function entity (e.g., AAnf), an authentication server function entity (e.g., AUSF), an access and mobility management function entity (e.g., AMF), or an application function entity (e.g., AF).

In some implementations, the first identifier is generated upon completion of a primary authentication. In some implementations, the first device is configured to use the first identifier to establish a secure communication with a network function within the wireless communication. In some implementations, the first device includes a user equipment (UE). In some implementations, the unified data management entity (e.g., UDM) and the user equipment (UE) store the first identifier.

In some implementations, the random number is included in an authentication vector to be used in a primary authentication. In some implementations, an authentication and key management for applications anchor function entity (e.g., AAnF) generates a new random number (e.g., a new RAND) to generate a new first identifier. In some implementations, the first device updates the first identifier using the new random number.

In some implementations, the first function entity includes a unified data management entity (e.g., UDM) and the first device includes a user equipment (UE), and the unified data management entity and the user equipment store the first identifier configured to be used to establish a secure communication for the first device. In some implementations, the unified data management entity and the user equipment generate and store the first identifier upon completion of a primary authentication. In some implementations, the indicator is a routing indicator to route network signaling with the indicator to unified data management instances.

Figure 19:
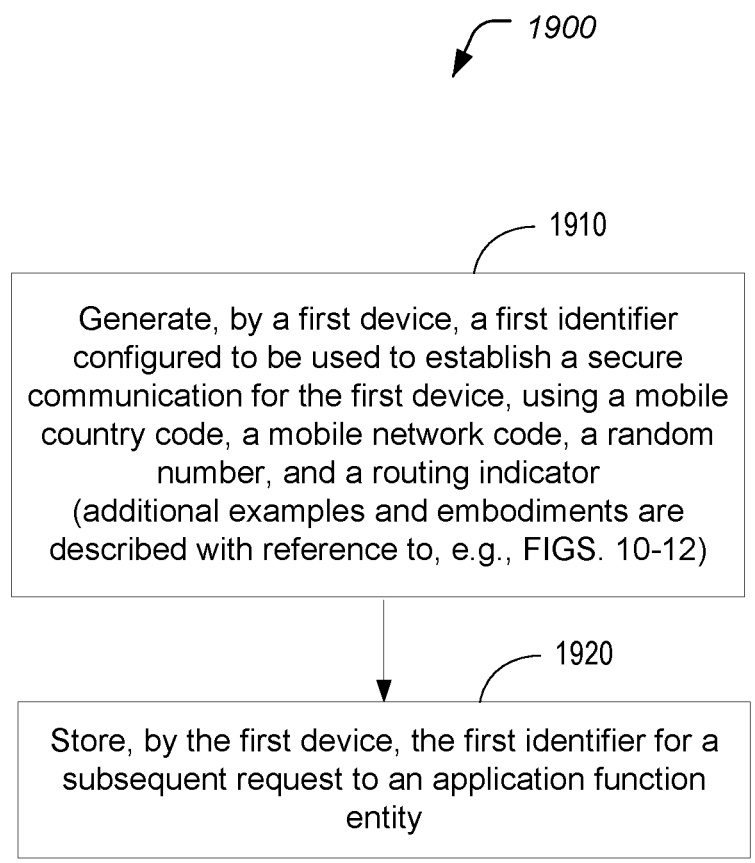
FIG. 19 is a flow diagram illustrating another example of a wireless communication method based on some embodiments of the disclosed technology.

FIG. 19 is a flow diagram illustrating another example of a wireless communication method based on some embodiments of the disclosed technology. The wireless communication method 1900 includes, at 1910, generating, by a first device, a first identifier configured to be used to establish a secure communication for the first device, using a mobile country code, a mobile network code, a random number, and a routing indicator, and at 1920, storing, by the first device, the first identifier for a subsequent request to an application function entity.

In some implementations, the wireless communication method 1900 further includes causing, by the first device, a unified data management entity to store the random number. In some implementations, the random number is generated and used in an authentication vector in a primary authentication.

In some embodiments of the disclosed technology, the first identifier includes the AKMAID discussed above. In some implementations, the first identifier is updated by an authentication and key management for applications (AKMA) anchor function entity (e.g., AAnF) using a new random number (e.g., new RAND) generated by the AKMA anchor function entity. In some implementations, the AKMA anchor function entity is configured to derive an application key (e.g., $K_{AF}$) using the new random number and an AKMA anchor key (e.g., $K_{AKMA}$).

In some implementations, the wireless communication method 1500 further includes updating, by the first device, the first identifier using a new random number generated by an authentication and key management for applications (AKMA) anchor function entity.

In some implementations, the first device is a user equipment (UE). In some implementations, the first device is configured to use the first identifier in an application session establishment process.

In some implementations, the first identifier is further based on an authentication and key management for applications anchor function (AAnF) identifier. In some implementations, the mobile country code is used to identify a country where the first function entity is operated, the mobile network code is used to identify a home public land mobile network, the random number is allocated by the first function entity to be used for authentication, the routing indicator is used to route network signaling with the authentication and key management, and the authentication and key management for applications anchor function (AAnF) identifier is used to identify an authentication and key management for applications anchor function (AAnF) function entity. In some implementations, the first identifier is used to identify authentication and key management for applications (AKMA) procedures for the first device. In some implementations, the first identifier is used as an identifier to identify an authentication and key management for applications (AKMA) anchor key.

Figure 20:
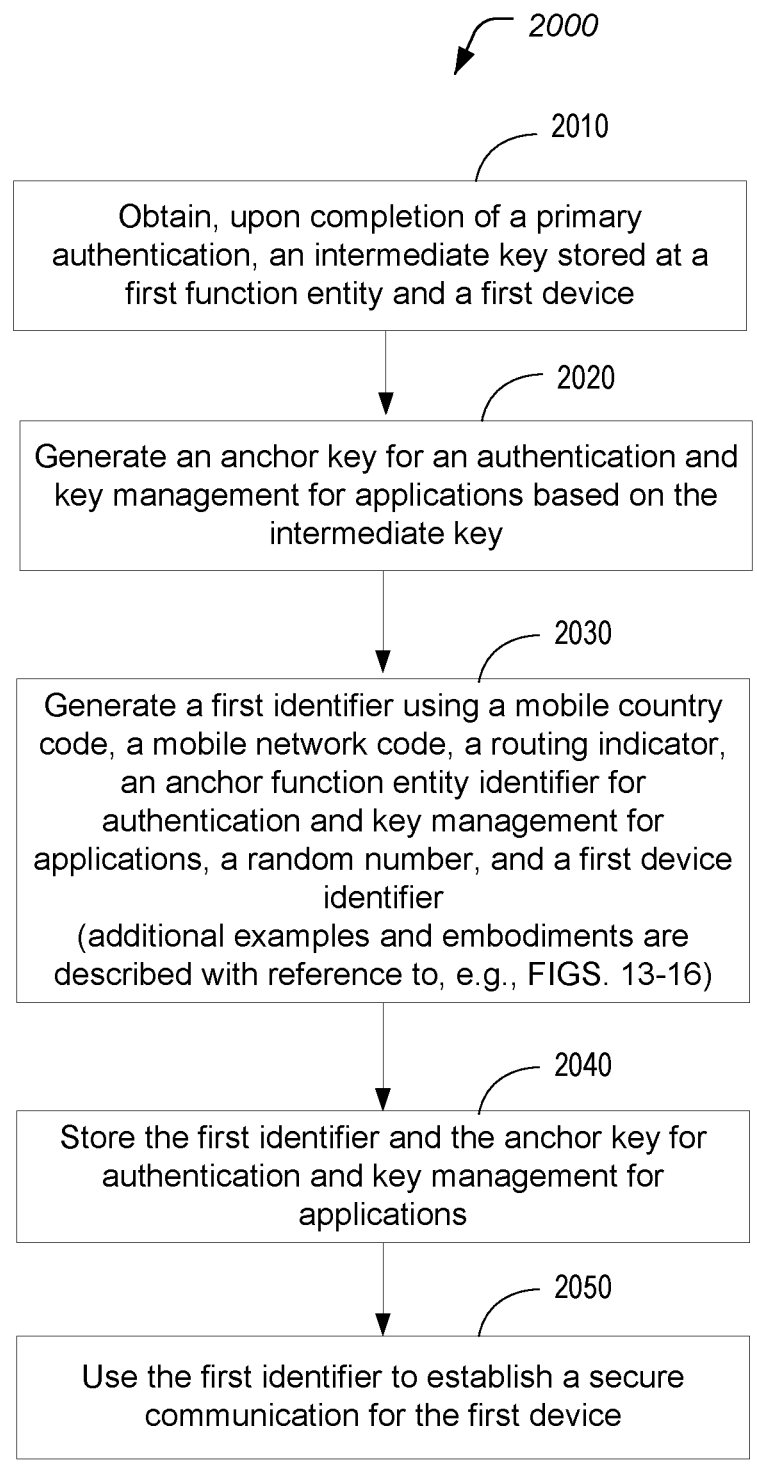
FIG. 20 is a flow diagram illustrating another example of a wireless communication method based on some embodiments of the disclosed technology.

FIG. 20 is a flow diagram illustrating another example of a wireless communication method based on some embodiments of the disclosed technology. The wireless communication method 2000 includes, at 2010, obtaining, upon completion of a primary authentication, an intermediate key stored at a first function entity and a first device, at 2020, generating an anchor key for an authentication and key management for applications based on the intermediate key, at 2030, generating a first identifier using a mobile country code, a mobile network code, a routing indicator, an anchor function entity identifier for authentication and key management for applications, a random number, and a first device identifier at 2040, storing the first identifier and the anchor key for authentication and key management for applications, and at 2050, using the first identifier to establish a secure communication for the first device. In some implementations, the first device identifier is a UE identifier.

In some implementations, the first function entity includes an authentication server function entity. In some implementations, the intermediate key includes an authentication server function key ($K_{AUSF}$). In some implementations, the anchor function entity identifier for authentication and key management for applications is used to identify an AKMA anchor function (AAnF) entity. In some implementations, using the first identifier to establish the secure communication for the first device includes causing an application function entity to transmit, to the AAnF entity, a key request including the first identifier.

In some implementations, using the first identifier to establish the secure communication for the first device includes causing the AAnF entity to derive an application function key based on the anchor key for authentication and key management for applications.

In some implementations, using the first identifier to establish the secure communication for the first device further includes causing the first device to derive an application function key based on the anchor key for authentication and key management for applications. In some implementations, using the first identifier to establish the secure communication for the first device includes generating a new random number to generate a new first identifier using the mobile country code, the mobile network code, the routing indicator, the anchor function entity identifier for authentication and key management for applications, and the new random number.

In some implementations, using the first identifier to establish the secure communication for the first device further includes causing the first device to update the first identifier with the new first identifier.

In some implementations, the wireless communication method 2000 further includes causing the authentication server function entity to inform a unified data management entity about a result of the primary authentication. In some implementations, the first device is a user equipment.

Figure 21:
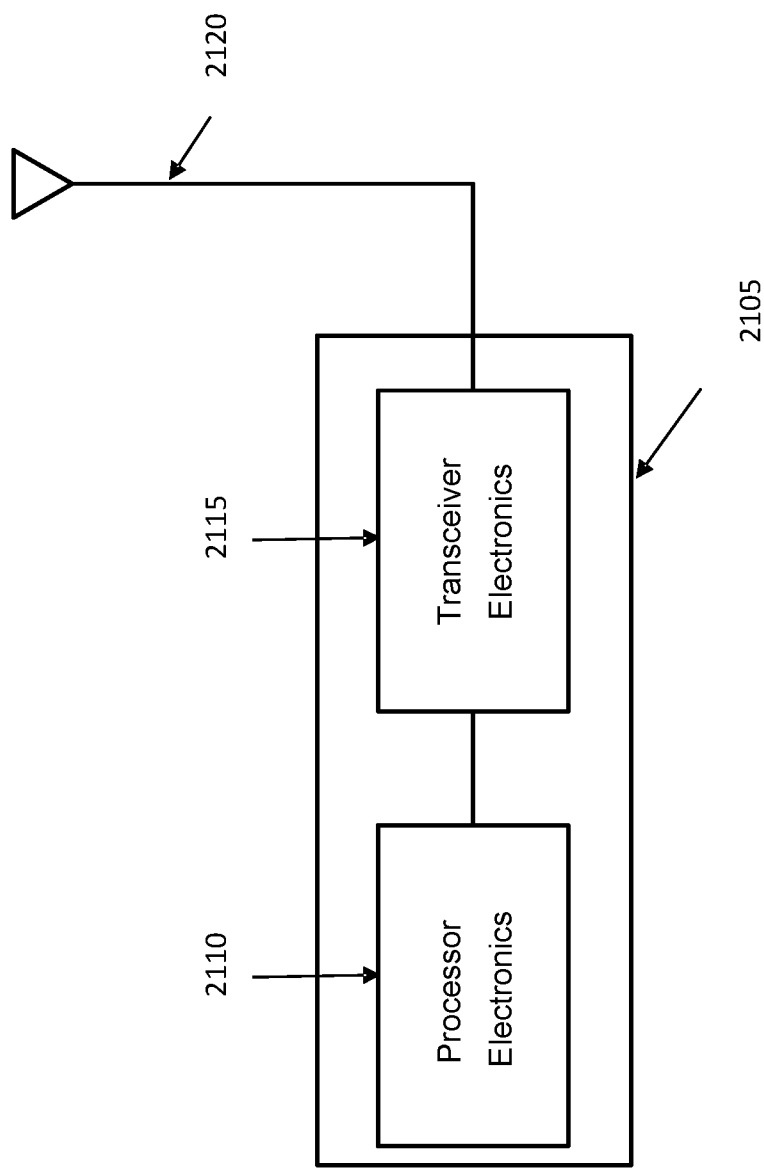
FIG. 21 is a block diagram representation of a portion of a radio station in accordance with one or more embodiments of the present technology can be applied.

FIG. 21 is a block diagram representation of a portion of a radio station in accordance with one or more embodiments of the present technology can be applied. A radio station 2105 such as a base station or a wireless device (or UE) can include processor electronics 2110 such as a microprocessor that implements one or more of the wireless techniques presented in this document. The radio station 2105 can include transceiver electronics 2115 to send and/or receive wireless signals over one or more communication interfaces such as antenna 2120. The radio station 2105 can include other communication interfaces for transmitting and receiving data. Radio station 2105 can include one or more memories (not explicitly shown) configured to store information such as data and/or instructions. In some implementations, the processor electronics 2110 can include at least a portion of the transceiver electronics 2115. In some embodiments, at least some of the disclosed techniques, modules or functions are implemented using the radio station 2105.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
generating, by a unified data management entity (UDM), an authentication and key management for applications (AKMA) identifier (AKMAID) for establishing a secure communication for a first device, the AKMAID including at least a mobile country code, a mobile network code, and a random number, the mobile country code identifying a country where the UDM is operated, the mobile network code identifying a home public land mobile network, the random number allocated by the UDM to be used for the first device, wherein the UDM is configured to communicate with at least one of a network exposure function entity, an authentication and key management for application anchor function entity, an authentication server function entity, an access and mobility management function entity, or an application function entity; and
transmitting the AKMAID to the first device.

2. The method of claim 1, wherein the AKMAID is used to identify at least one of authentication and key management for applications procedures for the first device or an authentication and key management for applications anchor key.

3. The method of claim 1, wherein the transmitting of the AKMAID to the first device is carried out by performing, by the unified data management entity, a parameter update procedure for the first device.

4. The method of claim 1, wherein at least one of the UDM or the first device stores the AKMAID.

5. The method of claim 1, further comprising sending, by the UDM, the AKMAID to a second function entity configured to store the AKMAID.

6. The method of claim 1, wherein a second function entity is the authentication server function entity.

7. The method of claim 1, wherein the AKMAID is generated upon completion of a primary authentication, and wherein the random number is included in an authentication vector to be used in the primary authentication.

8. A method for wireless communication, comprising:
generating, by a first device, a an authentication and key management for applications (AKMA) identifier (AKMAID) for establishing a secure communication for the first device, the AKMAID including at least a mobile country code, a mobile network code, and a random number, the mobile country code identifying a country where a unified data management entity (UDM) is operated, the mobile network code identifying a home public land mobile network, the random number allocated by the UDM to be used for the first device, wherein the UDM includes a unified data management entity configured to communicate with at least one of a network exposure function entity, an authentication and key management for application anchor function entity, an authentication server function entity, an access and mobility management function entity, or an application function entity; and
storing, by the first device, the AKMAID for a subsequent request to an application function entity.

9. The method of claim 8, wherein the AKMAID is used to identify at least one of authentication and key management for applications procedures for the first device or an authentication and key management for applications anchor key.

10. The method of claim 8, further comprising causing, by the first device, the unified data management entity to store the random number.

11. The method of claim 10, wherein the random number is generated and used in an authentication vector in a primary authentication.

12. A method for wireless communication, comprising:
obtaining, upon completion of a primary authentication, an intermediate key stored at a unified data management entity (UDM) and a first device;
generating an anchor key for authentication and key management for applications based on the intermediate key;
generating a an authentication and key management for applications (AKMA) identifier (AKMAID) including at least a mobile country code, a mobile network code, and a random number, the mobile country code identifying a country where the UDM is operated, the mobile network code identifying a home public land mobile network, the random number allocated by the UDM to be used for the first device, wherein the UDM is configured to communicate with at least one of a network exposure function entity, an authentication and key management for application anchor function entity, an authentication server function entity, an access and mobility management function entity, or an application function entity;

storing the AKMAID and the anchor key for authentication and key management for applications; and using the AKMAID to establish a secure communication for the first device.

13. The method of claim 12, further comprising causing the authentication server function entity to inform the unified data management entity about a result of the primary authentication.

14. The method of claim 12, wherein the intermediate key includes an authentication server function key.

15. The method of claim 12, wherein an anchor function entity identifier for authentication and key management for applications is used to identify an authentication and key management for applications anchor function entity, and the first device identifier is used to identify a user equipment.

16. The method of claim 15, wherein the using the AKMAID to establish the secure communication for the first device includes causing an application function entity to transmit, to the authentication and key management for applications anchor function entity, a key request including the AKMAID.

17. The method of claim 15, wherein the using the AKMAID to establish the secure communication for the first device includes causing the authentication and key management for applications anchor function entity to derive an application function key based on the anchor key for authentication and key management for applications.

18. The method of claim 15, wherein the using the AKMAID to establish the secure communication for the first device includes generating a new random number to generate a new AKMAID using the mobile country code, the mobile network code, a routing indicator, the anchor function entity identifier for authentication and key management for applications, and the new random number.

* * * * *